US012776723B2

(12) United States Patent
Tailliet et al.

(10) Patent No.: US 12,776,723 B2
(45) Date of Patent: Oct. 27, 2026

(54) VOLTAGE CONTROL CIRCUITRY ENABLING HIGH VOLTAGE COMPATIBLE RECTIFIER FOR WIRELESS CHARGING

(71) Applicant: STMicroelectronics International N.V., Geneva (CH)

(72) Inventors: Francois Tailliet, Fuveau (FR); Guglielmo Sirna, Aix en Provence (FR)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 2 days.

(21) Appl. No.: 18/481,333

(22) Filed: Oct. 5, 2023

(65) Prior Publication Data

US 2025/0119065 A1 Apr. 10, 2025

(51) Int. Cl.
*H02M 7/219* (2006.01)
*H02J 50/10* (2016.01)

(52) U.S. Cl.
CPC ............ *H02M 7/219* (2013.01); *H02J 50/10* (2016.02)

(58) Field of Classification Search
CPC ................................ H02M 7/219; H02J 50/10
USPC ........................................................ 307/104
See application file for complete search history.

(56) References Cited

U.S. PATENT DOCUMENTS 6,100,759 A * 8/2000 Sirna ......................... H03F 3/26 330/252
6,127,847 A * 10/2000 Sirna ................ H03K 19/01812 326/77
6,781,422 B1 * 8/2004 Yang ................ H03K 17/04123 326/82
8,558,584 B2 * 10/2013 Draxelmayr .......... H02M 7/538 327/108
8,558,586 B1 * 10/2013 Martin ............... H03K 17/6871 327/108
9,559,613 B2 * 1/2017 Ejury .................... H02M 7/538
2003/0015999 A1 1/2003 Corva et al.
2003/0197992 A1 10/2003 Numano
2006/0012405 A1 1/2006 Martins
2008/0054942 A1 3/2008 Drapkin et al.
2009/0040800 A1 * 2/2009 Sonnaillon .......... H02M 7/1626 363/127
2013/0200944 A1 8/2013 Enjalbert et al.
2016/0134279 A1 * 5/2016 Sicard .................. H03K 17/165 327/109
2019/0006954 A1 * 1/2019 Hwang ................. H02M 7/219
2019/0128555 A1 * 5/2019 Takeda .................... H02M 1/12
2020/0266714 A1 * 8/2020 Taylor ....................... H02J 7/02
(Continued)

*Primary Examiner* — Alfonso Perez Borroto
(74) *Attorney, Agent, or Firm* — Alston & Bird LLP

(57) ABSTRACT

A bridge rectifier circuit and a wireless power receiver configured to receive high voltage AC inputs and generate a stable DC voltage without exposing the bridge rectifier circuitry components to damaging high voltages are provided. The example bridge rectifier includes a plurality of rectifying transistors positioned to generate a DC voltage upon receiving an AC current. The example bridge rectifier circuitry further includes voltage control circuitry designed to output an intermediate voltage to a terminal of one or all of the rectifying transistors of the bridge rectifier. The output intermediate voltage prevents a voltage difference across the terminal of the rectifying transistor from exceeding a maximum voltage rating of the rectifying transistor.

13 Claims, 17 Drawing Sheets

(56) References Cited

U.S. PATENT DOCUMENTS

| | | | | |
|---|---|---|---|---|
| 2021/0091655 | A1* | 3/2021 | Hegde | H02M 7/5387 |
| 2022/0158561 | A1* | 5/2022 | Lind | H02M 3/1588 |
| 2023/0074022 | A1* | 3/2023 | Zhou | H02M 1/4258 |
| 2023/0101285 | A1* | 3/2023 | Luu | H02J 1/10<br>307/24 |

* cited by examiner

VOLTAGE CONTROL CIRCUITRY ENABLING HIGH VOLTAGE COMPATIBLE RECTIFIER FOR WIRELESS CHARGING

TECHNOLOGICAL FIELD

Embodiments of the present disclosure relate generally to bridge rectifier circuitry, and more particularly, to bridge rectifier circuitry configured to receive high alternating current (AC) input voltages.

BACKGROUND

In general, a wireless power receiver is configured to receive AC power from a wireless power transmission coil. The wireless power receiver comprises bridge rectifier circuitry configured to receive the transmitted AC power and generate a direct current (DC) voltage usable by an electronic device. The bridge rectifier circuitry may include one or more transistor components. A transistor component may be manufactured in accordance with a maximum voltage rating. The maximum voltage rating establishes the maximum potential difference that may be present at each of the terminals on the transistor component. A potential difference, or voltage, at or near the maximum voltage rating may damage the transistor component, particularly in an instance in which the transistor component is exposed to voltage differences at or near the maximum voltage rating for an extended period of time.

Applicant has identified many technical challenges and difficulties associated with receiving high AC input voltages at a bridge rectifier. Through applied effort, ingenuity, and innovation, Applicant has solved problems related to protecting the transistor components of a bridge rectifier from AC input voltages exceeding the maximum voltage rating of one or more transistor components by developing solutions embodied in the present disclosure, which are described in detail below.

BRIEF SUMMARY

Various embodiments are directed to an example bridge rectifier circuit and a wireless power receiver comprising a bridge rectifier circuit compatible to receive high voltage AC inputs and generate a stable DC voltage without exposing the bridge rectifier circuitry components to damaging high voltages. An example bridge rectifier circuit is provided. In some embodiments, the example bridge rectifier comprises a plurality of rectifying transistors; and voltage control circuitry configured to output an intermediate voltage to a terminal of a rectifying transistor. In some embodiments, the intermediate voltage prevents a voltage difference across the terminal from exceeding a maximum voltage rating of the rectifying transistor.

In some embodiments, an alternating current is received across a first AC input and a second AC input, the bridge rectifier circuit further comprising a high side portion comprising a first high side transistor and a second high side transistor, wherein the high side portion is configured to generate the DC voltage. In some embodiments, the bridge rectifier circuit further comprises a low side portion comprising a first low side transistor, and a second low side transistor, wherein the low side portion is configured to connect to an electrical ground reference.

In some embodiments, first high side voltage control circuitry is electrically connected to a terminal of the first high side transistor, and second high side voltage control circuitry is electrically connected to a terminal of the second high side transistor.

In some embodiments, the first high side transistor is configured in a diode configuration, wherein a drain terminal of the first high side transistor is electrically connected to a gate terminal of the first high side transistor.

In some embodiments, the first high side voltage control circuitry is electrically connected to a source terminal of the first high side transistor, wherein the first high side voltage control circuitry generates a first high side intermediate voltage at the source terminal of the first high side transistor based at least in part on the first AC input and the DC voltage.

In some embodiments, in an instance in which the first AC input is below a minimum input voltage, the first high side voltage control circuitry generates a first high side intermediate voltage at the source terminal of the first high side transistor, wherein the difference between the first AC input and the first high side intermediate voltage is less than a first high side maximum voltage rating of the first high side transistor.

In some embodiments, in an instance in which the first AC input is above a maximum output voltage, the first high side voltage control circuitry exhibits a negligible voltage drop across the first high side voltage control circuitry.

In some embodiments, the first high side voltage control circuitry comprises a first high side voltage control transistor, wherein a drain terminal of the first high side voltage control transistor is electrically connected to a drain terminal of the first high side transistor; wherein a source terminal of the first high side voltage control transistor is electrically connected to the DC voltage; and wherein the gate terminal of the first high side voltage control transistor is configured to receive a first modified AC component voltage based at least in part on the first AC input and the DC voltage.

In some embodiments, the first modified AC component voltage remains above a minimum high side voltage control transistor voltage.

In some embodiments, gate minimum voltage generator circuitry generates a gate minimum voltage based at least in part on a voltage difference between the DC voltage and the electrical ground.

In some embodiments, the minimum high side voltage control transistor voltage is based at least in part on the gate minimum voltage generated based at least in part on the DC voltage.

In some embodiments, the first high side voltage control circuitry further comprises intermediate voltage discharge circuitry configured to discharge the first high side intermediate voltage based at least in part on the first AC input.

In some embodiments, the first modified AC component voltage is generated by a modified AC component generator circuitry.

In some embodiments, the first modified AC component generator circuitry generates the first modified AC component voltage based at least in part on the gate minimum voltage generated by the gate minimum voltage generator circuitry, the first AC input, and a first bulk voltage generated by bulk voltage generator circuitry.

In some embodiments, a first drain low side voltage control circuitry is electrically connected to a drain terminal of the second low side transistor and to the first AC input, wherein a first gate low side voltage control circuitry is electrically connected to a gate terminal of the second low side transistor and to the second AC input, wherein a second drain low side voltage control circuitry is electrically connected to a drain terminal of the first low side transistor and to the second AC input, and wherein a second gate low side voltage control circuitry is electrically connected to a gate terminal of the first low side transistor and to the first AC input.

In some embodiments, the first drain low side voltage control circuitry is configured to generate a first drain low side intermediate voltage at the drain of the second low side transistor based at least in part on the first AC input and the DC voltage.

In some embodiments, the first drain low side voltage control circuitry generates the first drain low side intermediate voltage such that a voltage difference between a drain terminal of the second low side transistor and a gate terminal of the second low side transistor is less than a maximum voltage rating of the second low side transistor.

In some embodiments, in an instance in which the second AC input is greater than the first AC input, the first drain low side voltage control circuitry exhibits a negligible voltage drop across the first drain low side voltage control circuitry.

In some embodiments, the first drain low side voltage control circuitry generates the first drain low side intermediate voltage based at least in part on a gate maximum voltage generated by a gate maximum voltage generator circuitry and the first AC input, wherein the first gate low side voltage control circuitry generates the first gate low side intermediate voltage based at least in part on the gate maximum voltage generated by the gate maximum voltage generator circuitry and the second AC input.

A wireless power receiver including a bridge rectifier circuit configured to receive high voltage AC inputs and generate a stable DC voltage without exposing the bridge rectifier circuitry components to damaging high voltages is further provided. In some embodiments, the wireless power receiver includes a wireless power receiver coil and a bridge rectifier circuit configured to receive an alternating current (AC) voltage and generate a direct current (DC) voltage. In some embodiments, the bridge rectifier circuit includes a plurality of rectifying transistors and voltage control circuitry configured to output an intermediate voltage to a terminal of a rectifying transistor, wherein the intermediate voltage prevents a voltage difference across the terminal from exceeding a maximum voltage rating of the rectifying transistor.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
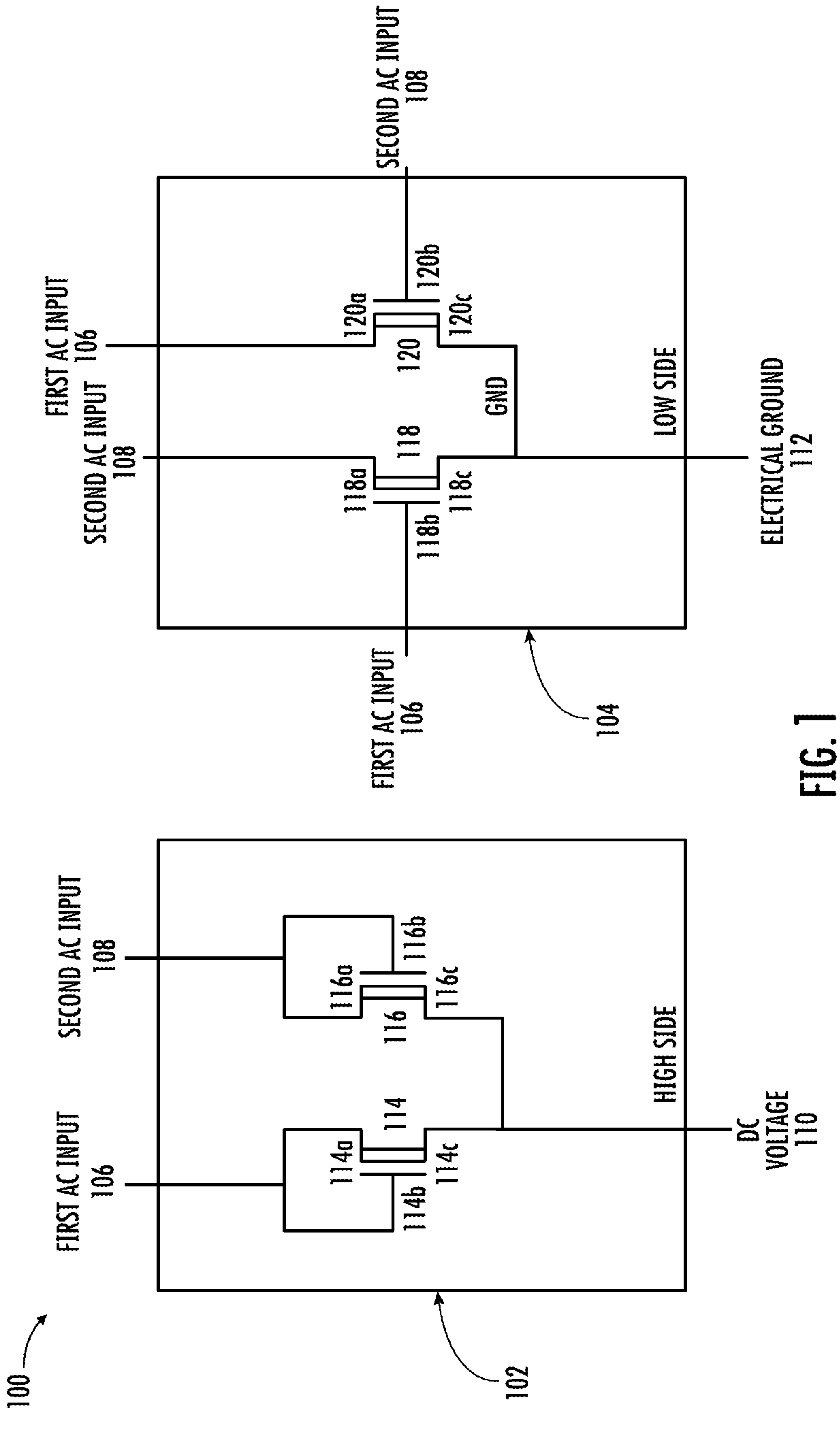
FIG. 1 illustrates example bridge rectifier circuitry having a high side portion and a low side portion.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

In general, a wireless power transmitter transmits alternating current (AC) power to a wireless power receiver using a wireless power transmission coil. The transmitted AC power is received by the wireless power receiver at a coupled wireless power receiver coil. The transmitted AC power received at the wireless power receiver coil may be subsequently converted to DC power using a bridge rectifier and passed through a voltage regulator to produce a stable output DC voltage for an electronic device.

Many devices receiving wirelessly transmitted AC power require compact designs of the wireless power receiver. For example, a wireless power receiver may be contained on a smart watch, smart phone, headphones, ear buds, and similar devices. In many instances, the space requirements of the electronic device demand a compact design for the wireless power receiver. Often, the compact space requirements limit the size of the wireless power receiver coil. For this reason, many compact electronic devices are utilizing low power wireless charging options, such as near-field communication (NFC) wireless charging (WLC), to receive wireless power.

Unlike the QI wireless charging standard, which requires large coils to transmit power between devices, NFC WLC utilizes a single antenna to manage communications with an NFC receiver and transfer wireless power. In NFC WLC the wave is modulated by the NFC reader to transmit both energy and data. In some embodiments, the transmitted AC power received at the wireless power receiver may be greater than the wireless power receiver is rated to handle.

A wireless power receiver may utilize a bridge rectifier to convert the received AC power into usable DC power. A bridge rectifier may comprise a plurality of transistor components (e.g., metal-oxide-semiconductor field-effect transistors (MOSFETs)) to facilitate the rectification of the received AC power. In general, a transistor component includes three terminals, a source terminal, a gate terminal, and a drain terminal. The source terminal is the terminal at which, when enabled, current generally flows into the transistor component. The drain terminal is the point at which the current generally flows out of the transistor component. The gate terminal of a transistor component is used to control the flow of current between the source terminal and the drain terminal. In some embodiments, a gate terminal voltage at or near the voltage of the source terminal may be applied to turn off the transistor component and stop the flow of current from the source terminal to the drain terminal. Conversely, a gate terminal voltage that creates a voltage difference between the gate terminal and the source terminal may turn on the transistor component and allow the flow of current from the source terminal to the gate terminal.

A transistor component may also have a maximum voltage rating. The maximum voltage rating establishes the maximum potential difference that may be present at any set of adjacent terminals of the transistor component. A potential difference, or voltage, greater than the maximum voltage rating of a transistor component may damage the transistor component, particularly in an instance in which a terminal is exposed to voltage differences at or near the maximum voltage rating for an extended period of time. The range of voltages the terminal of the transistor component is rated to safely withstand is often referred to as a safe operating area (SOA). For example, in some embodiments, a transistor component may have a maximum voltage rating of 12 volts. Thus, the safe operating area is within the range from −12 volts to +12 volts.

Referring now to FIG. 1, example bridge rectifier circuitry 100 is provided. As depicted in FIG. 1, the example bridge rectifier circuitry 100 includes a high side portion 102 and a low side portion 104. The example high side portion 102 is configured to receive a first AC input 106 and a second AC input 108 and generate a DC voltage 110. The example high side portion 102 includes a first high side transistor 114 and a second high side transistor 116. As depicted in FIG. 1, both the first high side transistor 114 and the second high side transistor 116 are configured in a diode configuration, meaning the drain terminal 114*a*, 116*a* of the high side transistor 114, 116 is electrically connected to the gate terminal 114*b*, 116*b*. As further depicted in FIG. 1, the source terminal 114*c* of the first high side transistor 114 and the source terminal 116*c* of the second high side transistor 116 are electrically connected to generate the DC voltage 110.

As further depicted in FIG. 1, the low side portion 104 of the example bridge rectifier circuitry 100 includes a first low side transistor 118 and a second low side transistor 120. In general, AC input is transmitted across two conductive inputs (e.g., first AC input 106 and second AC input 108). For example, the potential difference between the first AC input 106 and the second AC input 108 may be sinusoidal in nature, having a maximum peak-to-peak voltage represented by the difference between the maximum positive voltage on the sinusoidal waveform and the maximum negative voltage on the sinusoidal waveform. The drain terminal 118*a* of the first low side transistor 118 is electrically connected to a second AC input 108, as shown in FIG. 1. Further, the gate terminal 118*b* of the first low side transistor 118 is electrically connected to a first AC input 106. The source terminal 118*c* of the first low side transistor 118 is electrically connected to an electrical ground 112. In contrast, the drain terminal 120*a* of the second low side transistor 120 is electrically connected to a first AC input 106, and the gate terminal 120*b* of the second low side transistor 120 is electrically connected to a second AC input 108. The source terminal 120*c* of the second low side transistor 120 is electrically connected to the electrical ground 112.

As depicted in FIG. 1, the example high side portion 102 of the example bridge rectifier circuitry 100 includes two rectifying transistor components (e.g., first high side transistor 114, second high side transistor 116). A rectifying transistor component is any semiconductor device configured to control the flow of electronic signals through the rectifying transistor component by applying or removing a voltage. In general, a rectifying transistor component includes three terminals, a source terminal, a gate terminal, and a drain terminal. The source terminal is the terminal at which, when enabled, current generally flows into the rectifying transistor component. The drain terminal is the point at which the current generally flows out of the rectifying transistor component. The gate terminal of a rectifying transistor component is used to control the flow of current between the source terminal and the drain terminal.

In some embodiments, a rectifying transistor component may be a field-effect transistor (FET), or metal-oxide-semiconductor FET (MOSFET). A rectifying transistor component may comprise a p-channel or n-channel transistor. A p-channel transistor is configured to transmit a current when the voltage applied to the gate of the transistor is below a certain generally negative threshold voltage. Conversely, an n-type transistor is configured to transmit a current when a voltage exceeding a certain threshold voltage is applied to the gate terminal.

As depicted, the first high side transistor 114 and the second high side transistor 116 are both configured in a diode configuration. A rectifying transistor component is configured to act as a diode by electrically connecting the drain terminal (e.g., drain terminal 114*a*, 116*a*) with the gate terminal (e.g., gate terminal 114*b*, 116*b*). A transistor configured in a diode configuration causes the transistor to act as a two-terminal diode.

Although depicted as an n-channel transistor, in an instance in which the peak-to-peak voltage of the AC input is constant (e.g., non-radio frequency use), either or both of the first high side transistor 114 and the second high side transistor 116 may be configured as p-channel transistors in a cross-coupled configuration.

As further depicted in FIG. 1, the example low side portion 104 of the example bridge rectifier circuitry 100 includes two rectifying transistor components (e.g., first low side transistor 118, second low side transistor 120, the first low side transistor 118).

In some examples, an AC voltage with a peak-to-peak voltage greater than the maximum voltage rating of the rectifying transistor components within the bridge rectifier circuitry may be received. An AC input having a peak-to-peak AC voltage greater than the maximum voltage rating of one or more rectifying transistor components (e.g., first high side transistor 114, second high side transistor 116, first low side transistor 118, second low side transistor 120) may lead to voltage differences at one or more terminals of the rectifying transistor components greater than the maximum voltage rating of the rectifying transistor component. Voltage differences exceeding or near the maximum voltage rating of a rectifying transistor component may have a damaging impact on the rectifying transistor component, causing failure of the rectifying transistor component and/or reducing the overall life of the rectifying transistor component.

Figure 5:
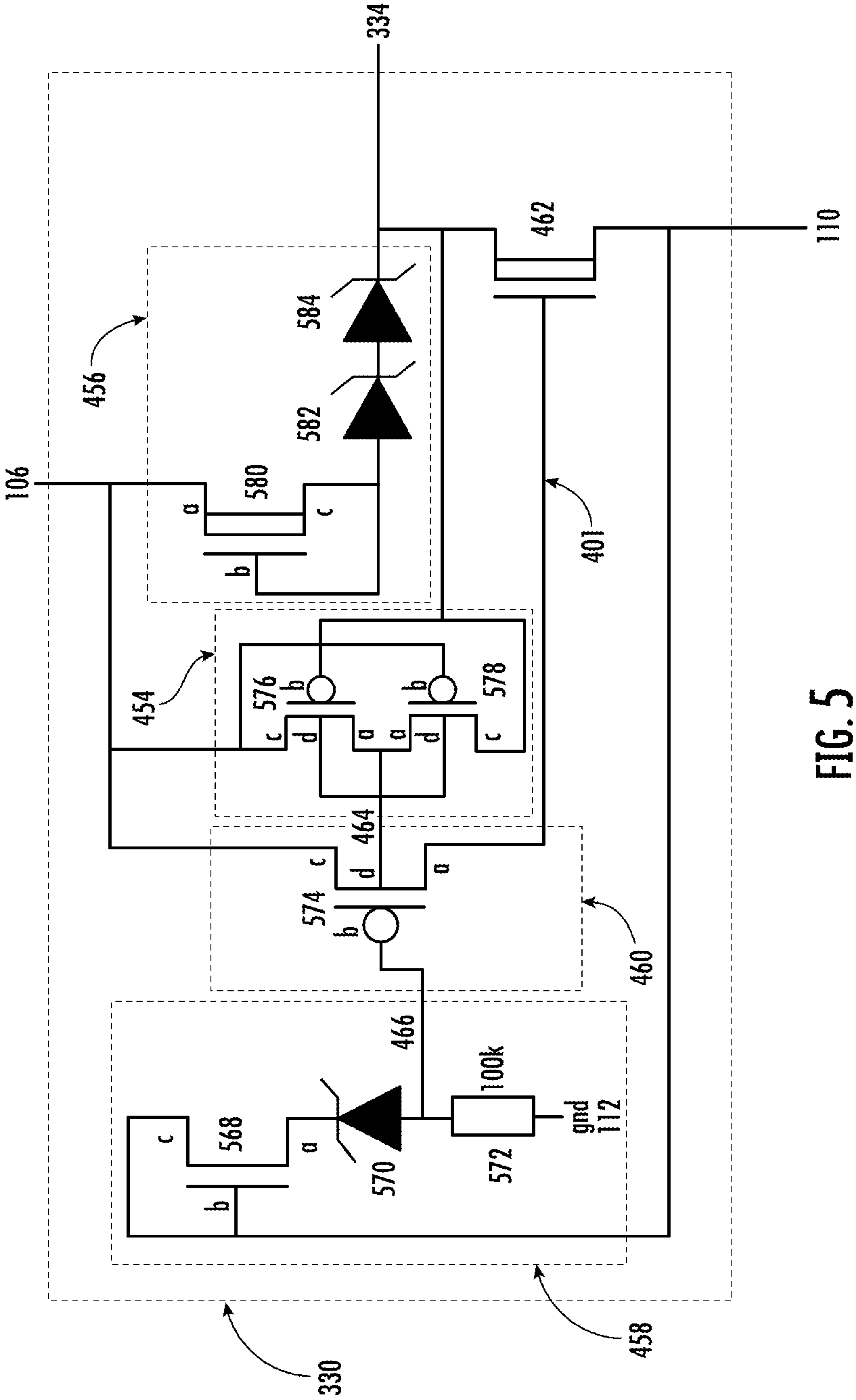
FIG. 5 illustrates an example circuit level diagram of an embodiment of first high side voltage control circuitry in accordance with an example embodiment of the present disclosure.

In some embodiments, the one or more rectifying transistor components (e.g., first high side transistor 114, second high side transistor 116, first low side transistor 118, second low side transistor 120) may comprise native transistors in which the transistor did not receive a threshold implant during manufacture. The lack of threshold implant in a native transistor may reduce the threshold voltage in the transistor as compared to an enhanced transistor (e.g., transistor 568, 574, 576, 578 as depicted in FIG. 5). Transistors depicted with an additional bar drawn in the channel may represent native transistors. However, such transistors are not limited to native transistors. Similarly, transistors depicted without an additional bar drawn in the channel may represent enhanced transistors, however, such transistors are not limited to enhanced transistors.

Figure 2:
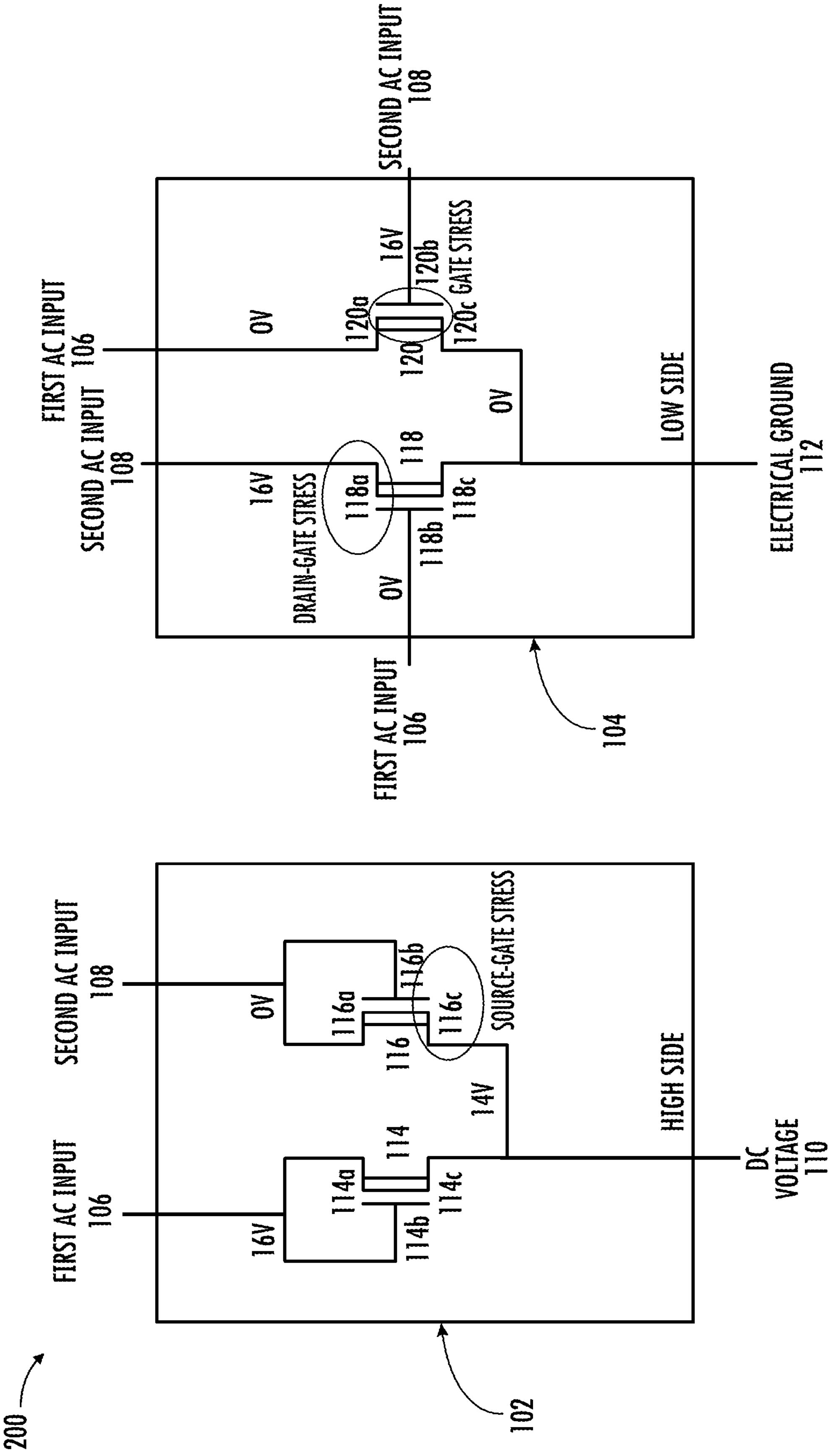
FIG. 2, illustrates example stresses on bridge rectifier circuitry in an instance in which an AC voltage exceeding the maximum voltage rating of one or more transistor components of the bridge rectifier circuit is received.

Referring now to FIG. 2, example bridge rectifier circuitry 200, without voltage control circuitry as described in the present disclosure, is provided. As depicted in FIG. 2, various terminals of the plurality of rectifying transistor components (e.g., first high side transistor 114, second high side transistor 116, first low side transistor 118, second low side transistor 120) are depicted experiencing stress at one or more terminals of the rectifying transistor component. In the depicted example of FIG. 2, each rectifying transistor component is manufactured with a maximum voltage rating of 12 volts. Thus, any voltage difference across any terminal of a rectifying transistor component may induce stress across the terminal and potentially damage the rectifying transistor component.

As depicted on the high side portion 102 of the example bridge rectifier circuitry 100 depicted in FIG. 2, the first AC input 106 is at 16 volts and the second AC input 108 is at 0 volts. Thus, the first high side transistor 114 is enabled (e.g., drives current) and the first AC input 106 is transmitted to the source terminal 114*c* of the first high side transistor 114, after experiencing a voltage drop equal to the threshold voltage of the first high side transistor 114 (e.g., 2 volts). As such, the voltage at the source terminal 116*c* at the second high side transistor 116 is at 14 volts while the gate terminal is at 0 volts. The 14-volt potential difference between the source terminal 116*c* and the gate terminal 116*b* of the second high side transistor 116 exceeds the maximum voltage rating of the second high side transistor 116, causing damaging stress to the second high side transistor 116. Without voltage control circuitry as described herein, the second high side transistor 116 may fail, or the lifetime of the second high side transistor may be reduced.

As further depicted in the low side portion 104 of the example bridge rectifier circuitry 100 depicted in FIG. 2, stress may be induced on the low side transistors (e.g., first low side transistor 118, second low side transistor 120), without voltage control circuitry as described in the present disclosure, in an instance in which the first AC input 106 is 0 volts and the second AC input 108 is 16 volts. As depicted in FIG. 2, in an instance in which the first AC input 106 is 0 volts and the second AC input 108 is 16 volts the drain terminal 118*a* of the first low side transistor 118 is at 16 volts, and the gate terminal 118*b* of the first low side transistor 118 is at 0 volts, thus the potential difference between the gate terminal 118*b* and the drain terminal 118*a* is 16 volts which is greater than the maximum voltage rating of the first low side transistor 118, potentially causing damage to the first low side transistor 118. Similarly, the drain terminal 120*a* and the source terminal 120*c* of the second low side transistor 120 are both at 0 volts, while the gate terminal 120*b* is at 16 volts, thus, causing damaging stress between the gate terminal 120*b* and both the drain terminal 120*a* and the source terminal 120*c* of the second low side transistor 120.

The various example embodiments described herein provide a plurality of voltage control circuitries to prevent a transistor-based rectifier bridge from operating outside the safe operating area (SOA) of the underlying rectifying transistor components.

In some embodiments, one or more voltage control circuitries are electrically connected to a terminal of a rectifying transistor of bridge rectifier circuitry to protect terminals susceptible to damaging voltage differences from a received AC input having a peak-to-peak voltage greater than the voltage rating of the rectifying transistor For example, high side voltage control circuitry blocks may be positioned between the source terminal of the high side rectifying transistors and the associated AC input terminal. The high side voltage control circuitry may be configured to reduce the maximum potential difference between the source terminal of the high side rectifying transistors and the rectified DC voltage.

Further, in some embodiments, drain low side voltage control circuitry blocks may be positioned between the drain terminals of the low side transistors of the bridge rectifying circuit and the associated AC input. The drain low side voltage control circuitry may be configured to generate an intermediate voltage based on the associated AC input limiting the voltage at the drain terminals of the low side transistors such that the voltage difference between the drain terminals and the gate terminals of the low side transistors does not exceed the maximum voltage rating of the low side transistors.

Similarly, in some embodiments, gate low side voltage control circuitry blocks may be positioned between the gate terminals of the low side transistors of the bridge rectifying circuit and the associated AC input. The gate low side voltage control circuitry may be configured to generate an intermediate voltage based on the associated AC input limiting the voltage at the gate terminals of the low side transistors such that the voltage difference between the gate terminals and the source/drain terminals of the low side transistors does not exceed the maximum voltage rating of the low side transistors.

As a result of the herein described example embodiments and in some examples, the effectiveness and durability of a bridge rectifying circuit may be greatly improved. In addition, a bridge rectifying circuit may be protected from high AC voltages received from a wireless power transmitter.

Figure 3:
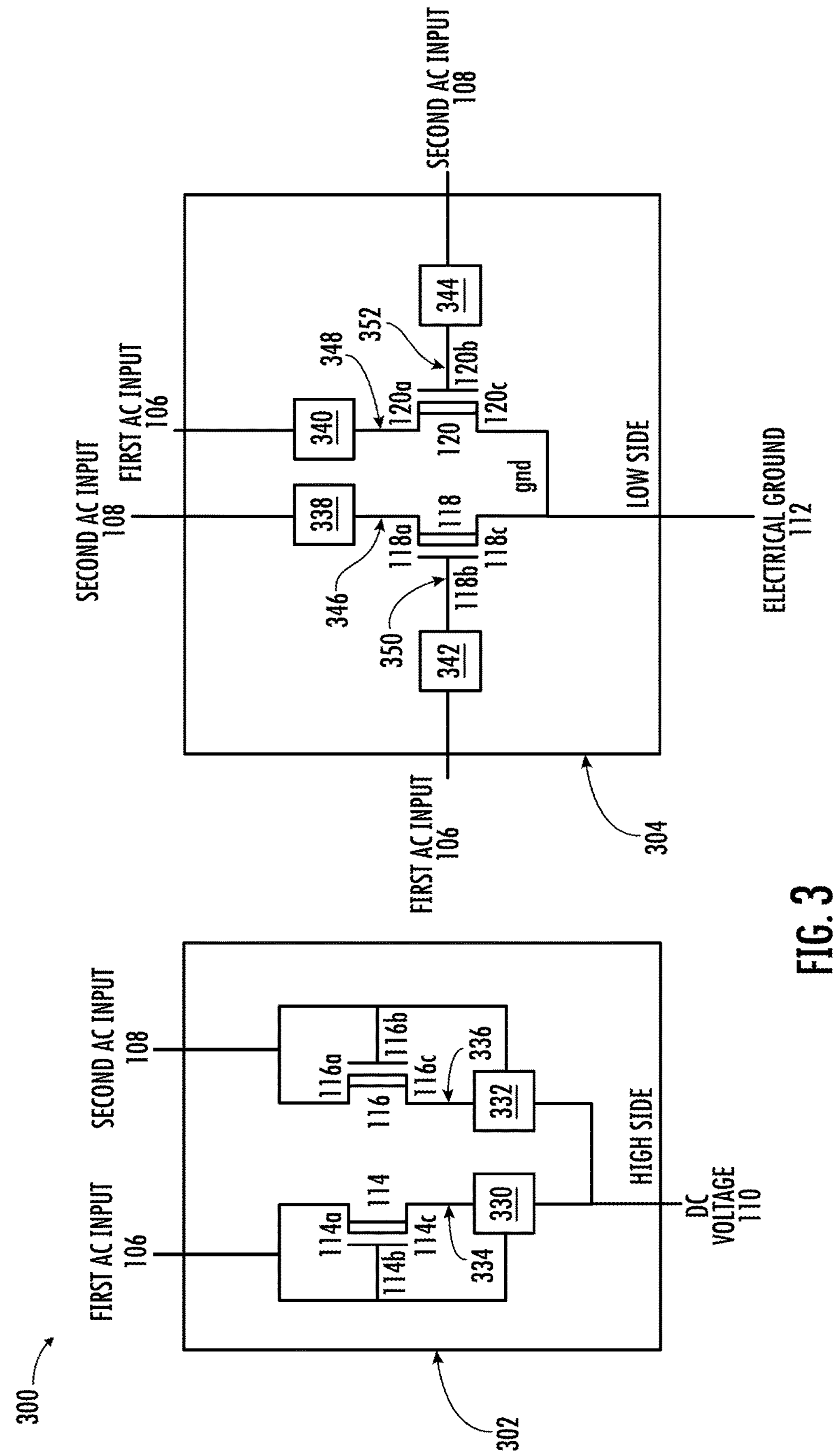
FIG. 3 illustrates example bridge rectifier circuitry comprising example voltage control circuitry configured to alleviate stresses on the transistor components of the example bridge rectifier circuitry in accordance with an example embodiment of the present disclosure.

Referring now to FIG. 3, example bridge rectifying circuitry 300 according to the present disclosure is provided. As depicted in FIG. 3, the example bridge rectifying circuitry 300 includes a high side portion 302 and a low side portion 304. The example high side portion 302 is configured to receive a first AC input 106 and a second AC input 108 and generate a DC voltage 110. The example high side portion 302 includes a first high side transistor 114 and a second high side transistor 116. As depicted in FIG. 1, both the first high side transistor 114 and the second high side transistor 116 are configured in a diode configuration, meaning the drain terminal 114*a*, 116*a* of the high side transistor 114, 116 is electrically connected to the gate terminal 114*b*, 116*b*. As further depicted in FIG. 1, a first high side voltage control circuitry 330 is electrically connected to the source terminal 114*c* of the first high side transistor 114 and is configured to generate a first high side intermediate voltage 334 based at least in part on the DC voltage 110. In addition, a second high side voltage control circuitry 332 is electrically connected to the source terminal 116*c* of second high side transistor 116 and configured to generate a second high side intermediate voltage 336 based at least in part on the DC voltage 110.

As further depicted in FIG. 3, the low side portion 304 of the example bridge rectifying circuitry 300 includes a first low side transistor 118 and a second low side transistor 120. A first drain low side voltage control circuitry 340 is electrically connected to the drain terminal 120*a* of the second low side transistor 120. The first drain low side voltage control circuitry 340 is configured to generate a first drain low side intermediate voltage 348 at the drain terminal 120*a* of the second low side transistor 120 based at least in part on the first AC input 106. In addition, a second drain low side voltage control circuitry 338 is electrically connected to the drain terminal 118*a* of the first low side transistor 118. The second drain low side voltage control circuitry 338 is configured to generate a second drain low side intermediate voltage 346 at the drain terminal 118*a* of the first low side transistor 118 based at least in part on the second AC input 108. As further shown in FIG. 3, a first gate low side voltage control circuitry 344 is electrically connected to the gate terminal 120*b* of the second low side transistor 120 and configured to generate a first gate low side intermediate voltage 352 based at least in part on the second AC input. In addition, a second gate low side voltage control circuitry 342 is electrically connected to the gate terminal 118*b* of the first low side transistor 118 and is configured to generate a second gate low side intermediate voltage 350 based at least in part on the first AC input 106. The source terminal of both the first low side transistor 118 and the second low side transistor 120 (118*c*, 120*c*) are both electrically connected to electrical ground 112.

As depicted in FIG. 3, the high side portion 302 of the example bridge rectifying circuitry 300 includes first high side voltage control circuitry 330 and second high side voltage control circuitry 332. The first high side voltage control circuitry 330 and second high side voltage control circuitry 332 are configured to output a first high side intermediate voltage 334 and second high side intermediate voltage 336, respectively, to avoid source-gate stress on the first high side transistor 114 and the second high side transistor 116. Source-gate stress may be avoided by adjusting the value of the first high side intermediate voltage 334 to ensure the absolute value of the difference between the voltage at the source terminal of the transistor and the gate terminal of the transistor does not exceed the maximum voltage rating of the transistor.

For example, in an instance in which the voltage of the first AC input 106 goes low, such that the voltage difference between the DC voltage 110 and the first AC input 106 is greater than the maximum voltage rating of the first high side transistor 114, the first high side intermediate voltage 334 may be reduced such that the difference in voltage between the gate terminal 114*b* and the source terminal 114*c* is less than the maximum voltage rating of the first high side transistor 114. Similarly, in an instance in which the voltage of the second AC input 108 goes low, such that the voltage difference between the DC voltage 110 and the second AC input 108 is greater than the maximum voltage rating of the second high side transistor 116, the second high side intermediate voltage 336 may be reduced such that the difference in voltage between the gate terminal 116*b* and the source terminal 116*c* is less than the maximum voltage rating of the second high side transistor 116.

In addition, the first high side voltage control circuitry 330 and the second high side voltage control circuitry 332 may be further configured to operate with negligible voltage drops in an instance in which the corresponding AC input is high.

For example, in an instance in which the first AC input 106 is high, the first high side voltage control circuitry 330 may be configured such that the internal circuitry does not induce a significant voltage drop. An example embodiment of the internal circuitry of the first high side voltage control circuitry 330 is depicted in relation to FIG. 4-FIG. 5 and FIG. 14.

Similarly, in an instance in which the second AC input 108 is high, the second high side voltage control circuitry 332 may be configured such that the internal circuitry does not induce a significant voltage drop. An example embodiment of the internal circuitry of the second high side voltage control circuitry 332 is depicted in relation to FIG. 6-FIG. 7 and FIG. 14.

As further depicted in FIG. 3, the example low side portion 304 of the example bridge rectifying circuitry 300 includes first drain low side voltage control circuitry 340 and second drain low side voltage control circuitry 338. The first drain low side voltage control circuitry 340 is configured to receive the first AC input 106 and generate a first drain low side intermediate voltage 348 at the drain terminal 120*a* of the second low side transistor 120. The first drain low side intermediate voltage 348 is configured to reduce the voltage difference between the drain terminal 120*a* and the gate terminal 120*b* of the second low side transistor 120 to a value less than the maximum voltage rating for the second low side transistor 120.

In addition, the first drain low side intermediate voltage 348 may be configured such that in an instance in which the second AC input 108 is higher than the first AC input 106, the internal circuitry of the first drain low side voltage control circuitry 340 does not introduce a significant voltage drop. An example embodiment of the internal circuitry of the first drain low side voltage control circuitry 340 is provided in relation to FIG. 11-FIG. 12.

As further depicted in FIG. 3, the second drain low side voltage control circuitry 338 is configured to receive the second AC input 108 and generate a second drain low side intermediate voltage 346 at the drain terminal 118*a* of the first low side transistor 118. The second drain low side intermediate voltage 346 is configured to reduce the voltage difference between the drain terminal 118*a* and the gate terminal 118*b* of the first low side transistor 118 to a value less than the maximum voltage rating for the first low side transistor 118.

In addition, the second drain low side intermediate voltage 346 may be configured such that in an instance in which the first AC input 106 is higher than the second AC input 108, the internal circuitry of the second drain low side voltage control circuitry 338 does not introduce a significant voltage drop. An example embodiment of the internal circuitry of the second drain low side voltage control circuitry 338 is provided in relation to FIG. 8-FIG. 9.

The electrical circuitry associated with the first drain low side voltage control circuitry 340 and the second drain low side voltage control circuitry 338 act as voltage followers and limiters of the first AC input 106 and the second AC input 108, respectively. For example, the first drain low side voltage control circuitry 340 and the second drain low side voltage control circuitry 338 may utilize a gate maximum voltage (e.g., gate maximum voltage 802 as further described in relation to FIG. 8-FIG. 10, gate maximum voltage 1102 as further described in relation to FIG. 11-FIG. 13, and gate maximum voltage as further described in FIG. 15) to limit the voltage at the drain terminal 118*a*, 120*a* of the associated low side transistor. In some embodiments, the first drain low side intermediate voltage 348 and the second drain low side intermediate voltage 346 may follow the first AC input 106 and the second AC input 108 respectively below the gate maximum voltage. Once the gate maximum voltage (minus the threshold voltage of described internal components) is reached, first drain low side voltage control circuitry 340 and second drain low side voltage control circuitry 338 may limit the first drain low side intermediate voltage 348 and second drain low side intermediate voltage 346, respectively, to the gate maximum voltage (minus the threshold voltage of described internal components).

As further depicted in FIG. 3, the example low side portion 304 of the example bridge rectifying circuitry 300 includes first gate low side voltage control circuitry 344 and second gate low side voltage control circuitry 342. The first gate low side voltage control circuitry 344 is configured to receive the second AC input 108 and generate a first gate low side intermediate voltage 352 at the gate terminal 120*b* of the second low side transistor 120. The first gate low side intermediate voltage 352 is configured to reduce the voltage difference between the gate terminal 120*b* and the drain terminal 120*a* and/or source terminal 120*c* of the second low side transistor 120 to a value less than the maximum voltage rating for the second low side transistor 120.

The first gate low side intermediate voltage 352 may be configured such that in an instance in which the second AC input 108 is higher than the first AC input 106, the electrical ground 112 is generated from the first AC input 106, through the second low side transistor 120. The ground potential path being first AC input 106, first drain low side voltage control circuitry 340, first drain low side intermediate voltage 348 which equals the voltage at the drain terminal 120*a* of the second low side transistor 120, then the source terminal 120*c* of the second low side transistor 120, which is electrically connected to the electrical ground 112.

In such an instance, the first drain low side voltage control circuitry 340 should have a negligible voltage drop, as it is in the path of the ground potential transmission. Further, the voltage drop occurs across the first gate low side voltage control circuitry 344 may vary as long as the voltage at gate terminal 120*b* is sufficient such that the second low side transistor 120 is activated (e.g., drives current).

For example, if second AC input 108 equals 16 volts and first AC input 106 equals 0 volts, the voltage at gate terminal 120*b* may remain below 12 volts such that a voltage drop from the second AC input 108 to the gate terminal 120*b* through the low side voltage control circuit 344 remains at least at 4 volts.

In summary, in an instance in which second AC input 108 is greater than first AC input 106, the second low side transistor 120 is activated and the first low side transistor 118 is deactivated (e.g., drives no current). In such an instance, the second low side transistor 120 transmits electrical ground potential from the first AC input 106 to electrical ground 112. A negligible voltage drop in the first drain low side voltage control circuitry 340 should occur, while a voltage drop of several volts in the first gate low side voltage control circuitry 344 may occur. An example embodiment of the internal circuitry of the first gate low side voltage control circuitry 344 is provided in relation to FIG. 11 and FIG. 13.

As further depicted in FIG. 3, the second gate low side voltage control circuitry 342 is configured to receive the first AC input 106 and generate a second gate low side intermediate voltage 350 at the gate terminal 118*b* of the first low side transistor 118. The second gate low side intermediate voltage 350 is configured to reduce the voltage difference between the gate terminal 118*b* and the drain terminal 118*a* and/or the source terminal 118*c* of the first low side transistor 118 to a value less than the maximum voltage rating for the first low side transistor 118.

In addition, the second gate low side intermediate voltage 350 may be configured such that in an instance in which the first AC input 106 is greater than the second AC input 108, the first low side transistor 118 is activated and the second low side transistor 120 is deactivated. In such an instance, the first low side transistor 118 transmits ground potential from the second AC input 108 to electrical ground 112. In such an instance, a negligible voltage drop in the second drain low side voltage control circuitry 338 should occur, while a voltage drop of several volts in the second gate low side voltage control circuitry 342 may occur. An example embodiment of the internal circuitry of the second gate low side voltage control circuitry 342 is provided in relation to FIG. 8 and FIG. 10.

The electrical circuitry associated with the first gate low side voltage control circuitry 344 and the second gate low side voltage control circuitry 342 act as voltage followers and limiters of the second AC input 108 and the first AC input 106, respectively. For example, the first gate low side voltage control circuitry 344 and the second gate low side voltage control circuitry 342 may utilize a gate maximum voltage (e.g., gate maximum voltage 802 as further described in relation to FIG. 8-FIG. 10, gate maximum voltage 1102 as further described in relation to FIG. 11-FIG. 13, and gate maximum voltage as further described in FIG. 15) to limit the voltage at the gate terminal 118*b*, 120*b* of the associated low side transistor. In some embodiments, the first gate low side intermediate voltage 352 and the second gate low side intermediate voltage 350 may follow the second AC input 108 and the first AC input 106 respectively below the gate maximum voltage. Once the gate maximum voltage is reached (minus the threshold voltage of described internal components), first gate low side voltage control circuitry 344 and second gate low side voltage control circuitry 342 may limit the first gate low side intermediate voltage 352 and the second gate low side intermediate voltage 350, respectively, to the gate maximum voltage (minus the threshold voltage of described internal components).

Figure 4:
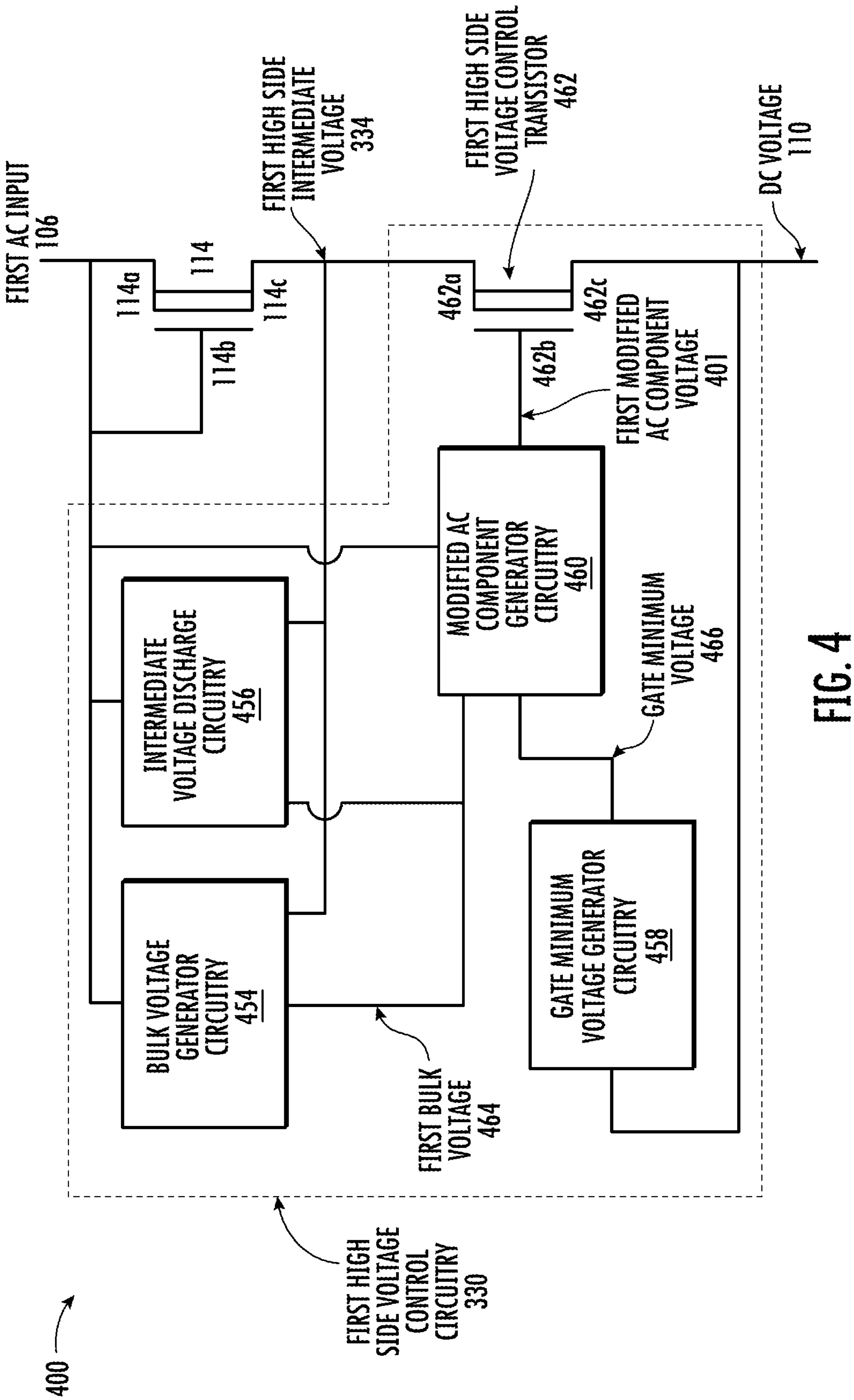
FIG. 4 illustrates a block diagram of an example first segment of the high side portion of an example bridge rectifier including example first high side voltage control circuitry in accordance with an example embodiment of the present disclosure.

Referring now to FIG. 4, a first segment 400 of the high side portion 302 of the example bridge rectifying circuitry 300 is provided. As depicted in FIG. 4, the first segment 400 includes a first high side transistor 114 configured to receive a first AC input 106 at the drain terminal 114*a* and the gate terminal 114*b* of the first high side transistor 114. A first high side intermediate voltage 334 is generated at the source terminal 114*c* of the first high side transistor 114. The first segment 400 further includes a first high side voltage control circuitry 330 configured to receive the first AC input 106 and the DC voltage 110 generated by the high side portion 302 of the bridge rectifying circuitry 300 and generate the first high side intermediate voltage 334.

As further depicted in FIG. 4, the first high side voltage control circuitry 330 further includes a first high side voltage control transistor 462 configured to receive a first modified AC component voltage 401 at the gate terminal 462*b*, the DC voltage 110 at the source terminal 462*c*, and generate the first high side intermediate voltage 334 at the drain terminal 462*a*. As depicted in FIG. 4, modified AC component generator circuitry 460 is also included in the first high side voltage control circuitry 330 and configured to generate the first modified AC component voltage 401 based on the first AC input 106, a gate minimum voltage 466, and a first bulk voltage 464. The gate minimum voltage 466 is generated by gate minimum voltage generator circuitry 458 based on the DC voltage 110. The first bulk voltage 464 is generated by bulk voltage generator circuitry 454 based on the first AC input 106 and the first high side intermediate voltage 334.

As further depicted in FIG. 4, the first high side voltage control circuitry 330 includes intermediate voltage discharge circuitry 456. The intermediate voltage discharge circuitry 456 is configured to discharge the first high side intermediate voltage 334 in an instance in which the first AC input 106 is returning to 0 volts based at least in part on the first AC input 106 and the first high side intermediate voltage 334.

As depicted in FIG. 4, the first high side voltage control circuitry 330 includes a first high side voltage control transistor 462. Although depicted as an n-channel metal-oxide-semiconductor (nMOS) transistor, the first high side voltage control transistor 462 may be any electrical component or system of electrical components configured to generate a first high side intermediate voltage 334 at the source terminal of the first high side transistor 114 such that the voltage difference between the source terminal 114*c* and the gate terminal 114*b* of the first high side transistor 114 does not exceed the maximum voltage rating of the first high side transistor 114. For example, as depicted in FIG. 4, the first high side voltage control transistor 462 is configured to receive the DC voltage 110 at the source terminal 462*c* and the first modified AC component voltage 401 at the gate terminal 462*b* and generate a voltage at the drain terminal 462*a* such that in an instance in which the first AC input 106 drops below a minimum input voltage, the first high side intermediate voltage 334 is lower than the DC voltage 110. The minimum input voltage may be any voltage resulting in a difference between the first AC input 106 and the DC voltage 110 greater than the maximum voltage rating of the first high side transistor 114.

As further depicted in FIG. 4, the first high side voltage control circuitry 330 includes modified AC component generator circuitry 460. The modified AC component generator circuitry 460 is any electrical component or system of electrical components configured to output a first modified AC component voltage 401 at the gate terminal 462*b* of the first high side voltage control transistor 462. The first modified AC component voltage 401 is generated by the modified AC component generator circuitry 460 such that in an instance in which the first AC input 106 falls below a minimum high side voltage control the first modified AC component voltage 401 remains at or above the minimum high side voltage. A specific embodiment of the modified AC component generator circuitry 460 is shown in relation to FIG. 5. The first modified AC component voltage 401 is described further in relation to FIG. 17.

As further depicted in FIG. 4, the first high side voltage control circuitry 330 includes gate minimum voltage generator circuitry 458. Gate minimum voltage generator circuitry 458 is any electrical component or system of electrical components configured to output a gate minimum voltage 466 based at least in part of the DC voltage 110 generated by the bridge rectifying circuitry 300. The gate minimum voltage 466 dictates, at least in part, the minimum voltage of the first modified AC component voltage 401. For example, the first modified AC component voltage 401 may closely approximate the first AC input 106, until the first AC input 106 drops below the gate minimum voltage 466. In an instance in which the first AC input 106 drops below the gate minimum voltage 466 (plus the absolute value of the threshold of herein described internal components, e.g., pMOS transistor 574), the first modified AC component voltage 401 remains substantially equivalent to the gate minimum voltage 466 (plus the absolute value of the threshold of herein described internal components). The gate minimum voltage 466 further varies based on the amplitude of the AC input, and thus the DC voltage 110. For example, the gate minimum voltage 466 may be substantially equivalent to the DC voltage 110, minus a constant, such as 7 volts. A specific embodiment of the gate minimum voltage generator circuitry 458 is shown in relation to FIG. 5. The gate minimum voltage 466 is described further in relation to FIG. 16.

As further depicted in FIG. 4 the first high side voltage control circuitry 330 includes bulk voltage generator circuitry 454. The first high side voltage control circuitry 330 is any electrical component or system of electrical components configured to generate a first bulk voltage 464 utilized by one or more connected electrical components to ensure the bulk voltage of the connected electrical components (e.g., pMOS transistor 576 and pMOS transistor 578 as described in relation to FIG. 5) is greater than or equal to the voltage at the source and drain terminals of the connected electrical components. The first bulk voltage 464 reduces the parasitic effects of connected electrical components. In some embodiments, the first bulk voltage is the greater of the first AC input 106 and the first high side intermediate voltage 334. As depicted in FIG. 4, the first bulk voltage 464 is received by one or more electrical components of the modified AC component generator circuitry 460 and the intermediate voltage discharge circuitry 456. A specific embodiment of the bulk voltage generator circuitry 454 is shown in relation to FIG. 5.

As depicted in FIG. 4, the first high side voltage control circuitry 330 includes intermediate voltage discharge circuitry 456. The intermediate voltage discharge circuitry 456 is any electrical component or system of electrical components configured to discharge the first high side intermediate voltage 334. For example, in an instance in which the first AC input 106 is returning to a low voltage, the intermediate voltage discharge circuitry 456 may enable the first high side intermediate voltage 334 to be discharged, thus preventing a high floating voltage at the source terminal 114*c* of the first high side transistor 114. For example, when the first AC input 106 is high and reaches, for example, 15 volts, then the first high side transistor 114, which is diode-mounted, will experience a potential of about 13 volts at its source terminal 114*c*. This voltage is equal to the first high side intermediate voltage 334. In an instance in which the first AC input 106 transitions to a low voltage, the first high side transistor 114 will deactivate (e.g., drive no current) and the first high side intermediate voltage 334 may remain floating at or near 13 volts. As the first AC input 106 reaches 0 volts and the source terminal 114*c* remains near 13 volts, a potential exceeding the maximum voltage rating may exist between the gate terminal 114*b* and the source terminal 114*c*. As such, when the first AC input 106 transitions to a low voltage, the intermediate voltage discharge circuitry 456 reduces the first high side intermediate voltage 334 below the value it had reached when the first AC input 106 was at its peak value. An example embodiment of intermediate voltage discharge circuitry 456 is depicted in relation to FIG. 5 and FIG. 14.

Referring now to FIG. 5, an example embodiment of the first high side voltage control circuitry 330 is depicted. As depicted in FIG. 5, the example embodiment of the first high side voltage control circuitry 330 includes an example embodiment of gate minimum voltage generator circuitry 458, an example embodiment of modified AC component generator circuitry 460, an example embodiment of bulk voltage generator circuitry 454, an example embodiment of intermediate voltage discharge circuitry 456, and an example first high side voltage control transistor 462.

As depicted in FIG. 5, the example gate minimum voltage generator circuitry 458 of the example embodiment of the first high side voltage control circuitry 330 includes a resistive element 572, a Zener diode 570, and a transistor 568 in diode configuration, connected in series between and electrical ground 112 and the DC voltage 110, with the anode of the Zener diode 570 electrically connected to the resistive element 572, and the cathode of the Zener diode 570 electrically connected to the source terminal 568*a* of the transistor 568. The example gate minimum voltage generator circuitry 458 of FIG. 5 is configured to output a gate minimum voltage 466 based on the threshold voltage of the Zener diode 570 and the transistor 568. For example, in an instance in which the DC voltage 110 is below the threshold voltage of the Zener diode 570, the gate minimum voltage 466 is 0. However, as the DC voltage 110 increases above the threshold of the Zener diode 570 plus the threshold of the transistor 568, the gate minimum voltage 466 may increase with the DC voltage 110. Thus, in an instance in which the threshold voltage of the transistor 568 is 1 volt and the threshold voltage of the Zener diode 570 is 6 volts, the gate minimum voltage may be 0 volts for any DC voltage 110 below 7 volts. However, once the DC voltage 110 increases above 7 volts, the gate minimum voltage 466 may be the DC voltage 110 minus the threshold of the transistor 568 (1 volt) minus the threshold of the Zener diode 570 (6 volts), or DC voltage 110 minus 7 volts.

As further depicted in FIG. 5, the example modified AC component generator circuitry 460 of the example embodiment of the first high side voltage control circuitry 330 includes a p-channel MOS (pMOS) transistor 574 configured to receive the first AC input 106 at the source terminal 574*c* of the transistor 574, the gate minimum voltage 466 at the gate terminal 574*b*, the first bulk voltage 464 at the bulk terminal 574*d* and generate the first modified AC component voltage 401. As depicted in FIG. 5, the first AC input 106 may be transmitted as the first modified AC component voltage 401 in an instance in which the first AC input 106 and the first modified AC component voltage 401 are higher than the gate minimum voltage 466 by at least the absolute value of the threshold voltage of the pMOS transistor 574 (e.g., 1 volt). For example, in an instance in which the DC voltage 110 is 10 volts, the source terminal 568*a* of the transistor 568 may be approximately 8.5 volts due to a 1.5 voltage drop across the transistor 568, and the gate minimum voltage 466 may equal 3 volts, for example, in an instance in which the threshold of the Zener diode 570 is 5.5 volts. In such an instance, the transistor 574 may transmit the first AC input 106 as the first modified AC component voltage 401 as long as the first AC input 106 is greater than 4 volts (e.g., gate minimum voltage 466 of 3 volts plus the threshold voltage of the transistor 574).

As further depicted in FIG. 5, the example bulk voltage generator circuitry 454 of the example embodiment of the first high side voltage control circuitry 330 includes a first pMOS transistor 576 and a second pMOS transistor 578 configured to output the first bulk voltage 464 substantially equivalent to the maximum voltage between the first high side intermediate voltage 334 and the first AC input 106. As depicted in FIG. 5, the source terminal 576*c* of the first pMOS transistor 576 is electrically connected to the first AC input 106, the gate terminal 576*b* is electrically connected to the first high side intermediate voltage 334, the drain terminal 576*a* is electrically connected to the drain terminal 578*a* of the second pMOS transistor 578, and the bulk terminal 576*d* is electrically connected to the first bulk voltage 464. Further, the source terminal 578*c* of the second pMOS transistor 578 is electrically connected to the first high side intermediate voltage 334, the gate terminal 578*b* is electrically connected to the first AC input 106, the drain terminal 578*a* is electrically connected to the drain terminal 576*a* of the first pMOS transistor 576, and the bulk terminal 578*d* is electrically connected to the first bulk voltage 464. The first bulk voltage 464 is generated from the electrical connection between the drain terminal 576*a* of the first pMOS transistor 576 and the drain terminal 578*a* of the second pMOS transistor 578.

As further depicted in FIG. 5, the example intermediate voltage discharge circuitry 456 of the example embodiment of the first high side voltage control circuitry 330 includes an nMOS transistor 580, a first Zener diode 582, and a second Zener diode 584 electrically connected in series between the first AC input 106 and the first high side intermediate voltage 334, wherein the anode of the first Zener diode 582 is electrically connected to the source terminal 580*c* of the nMOS transistor 580, the cathode of the first Zener diode 582 is electrically connected to the anode of the second Zener diode 584, and the cathode of the second Zener diode 584 generates the first high side intermediate voltage 334. As further depicted, the transistor 580 is configured in a diode configuration, wherein the source terminal 580*c* is electrically connected to the gate terminal 580*b*, and concurrently connected to the first Zener diode 582. As further depicted, the drain terminal 580*a* is electrically connected to the first AC input 106.

Figure 6:
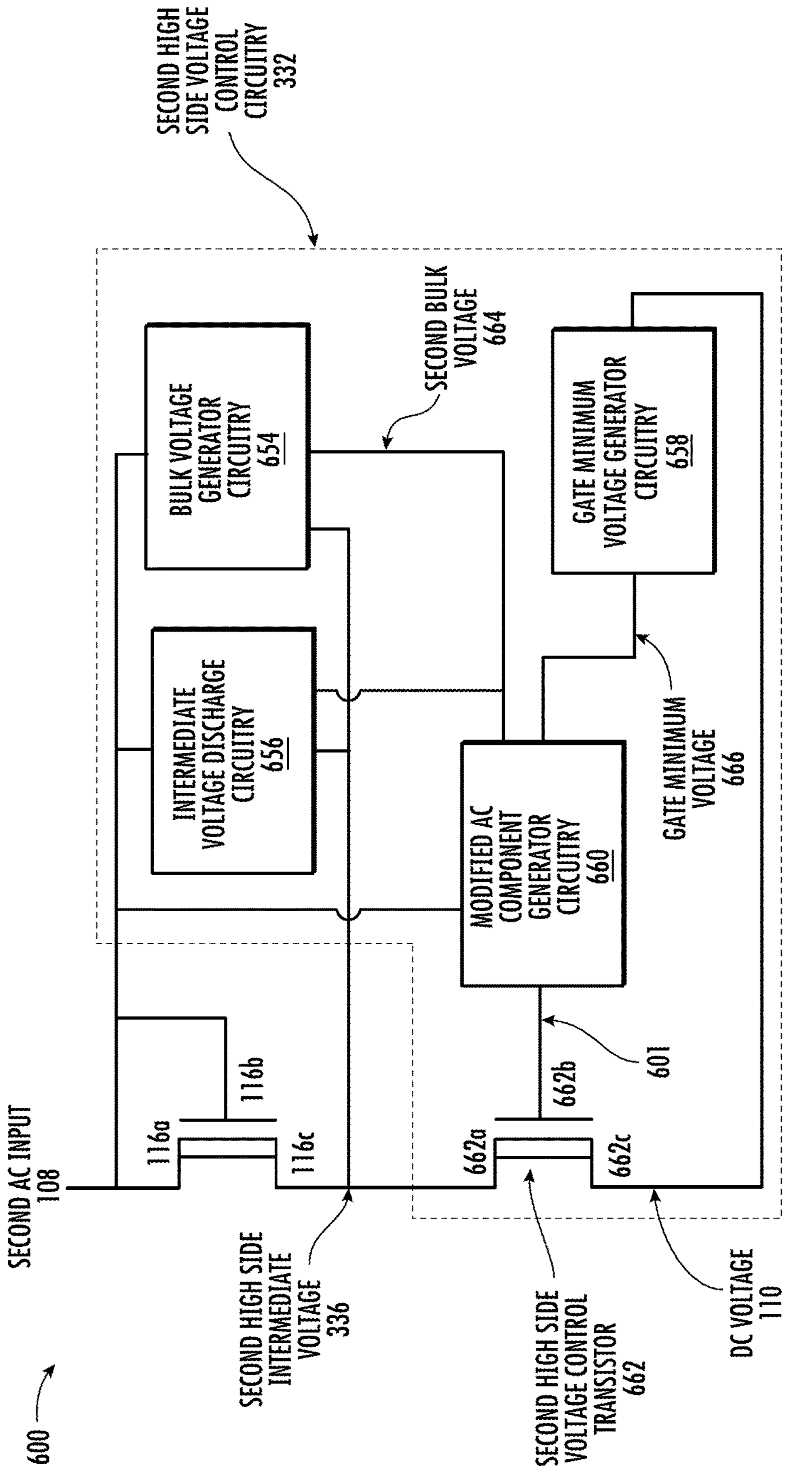
FIG. 6 illustrates a block diagram of an example second segment of the high side portion of an example bridge rectifier including example second high side voltage control circuitry in accordance with an example embodiment of the present disclosure.

Referring now to FIG. 6, a second segment 600 of the high side portion 302 of the bridge rectifying circuitry 300 is provided. As depicted in FIG. 6, the second segment 600 includes a second high side transistor 116 configured to receive a second AC input 108 at the drain terminal 116*a* and the gate terminal 116*b* of the second high side transistor 116. A second high side intermediate voltage 336 is generated at the source terminal 116*c* of the second high side transistor 116. The second segment 600 further includes a second high side voltage control circuitry 332 configured to receive the second AC input 108 and the DC voltage 110 generated by the high side portion 302 of the bridge rectifying circuitry 300 and generate the second high side intermediate voltage 336.

As further depicted in FIG. 6, the second high side voltage control circuitry 332 further includes a second high side voltage control transistor 662 configured to receive a second modified AC component voltage 601 at the gate terminal 662*b*, the DC voltage 110 at the source terminal 662*c*, and generate the second high side intermediate voltage 336 at the drain terminal 662*a*. As depicted in FIG. 6, modified AC component generator circuitry 660 is also included in the second high side voltage control circuitry 332 and configured to generate the second modified AC component voltage 601 based on the second AC input 108, a gate minimum voltage 666, and a second bulk voltage 664. The gate minimum voltage 666 is generated by gate minimum voltage generator circuitry 658 based on the DC voltage 110. The second bulk voltage 664 is generated by bulk voltage generator circuitry 654 based on the second AC input 108 and the second high side intermediate voltage 336.

As further depicted in FIG. 6, the second high side voltage control circuitry 332 includes intermediate voltage discharge circuitry 656. The intermediate voltage discharge circuitry 656 is configured to discharge the second high side intermediate voltage 336 in an instance in which the second AC input 108 is returning to 0 volts based at least in part on the second AC input 108 and the second high side intermediate voltage 336.

As depicted in FIG. 6, the second segment 600 of the high side portion 302 of the bridge rectifying circuitry 300 includes a second high side voltage control circuitry 332 configured to generate a second high side intermediate voltage 336 based on the second AC input 108. The second high side voltage control circuitry 332 is substantially equivalent to the first high side voltage control circuitry 330, however, the second high side voltage control circuitry 332 receives the second AC input and generates the second high side intermediate voltage 336. Thus, the high side voltage control transistor 662, the modified AC component generator circuitry 660, the gate minimum voltage generator circuitry 658, the intermediate voltage discharge circuitry 656, and the bulk voltage generator circuitry 654 may be configured as described in relation to FIG. 4-FIG. 5.

In some embodiments, the gate minimum voltage generator circuitry 458 and the gate minimum voltage generator circuitry 658 may comprise a common shared circuitry block. In such an instance, the gate minimum voltage 466 depicted in FIG. 4 and FIG. 5, and the gate minimum voltage 666 depicted in FIG. 6 and FIG. 7 may be the same unique node. Both the gate minimum voltage 466 and the gate minimum voltage 666 may be generated by the same circuitry based on the electrical ground 112 and the DC voltage 110 and transmitted to the gate minimum voltage generator circuitry 458 and the gate minimum voltage generator circuitry 658 respectively. Utilizing common circuitry to generate the gate minimum voltage 466 and the gate minimum voltage 666 may reduce the overall area and the power consumption of the electrical component.

Figure 7:
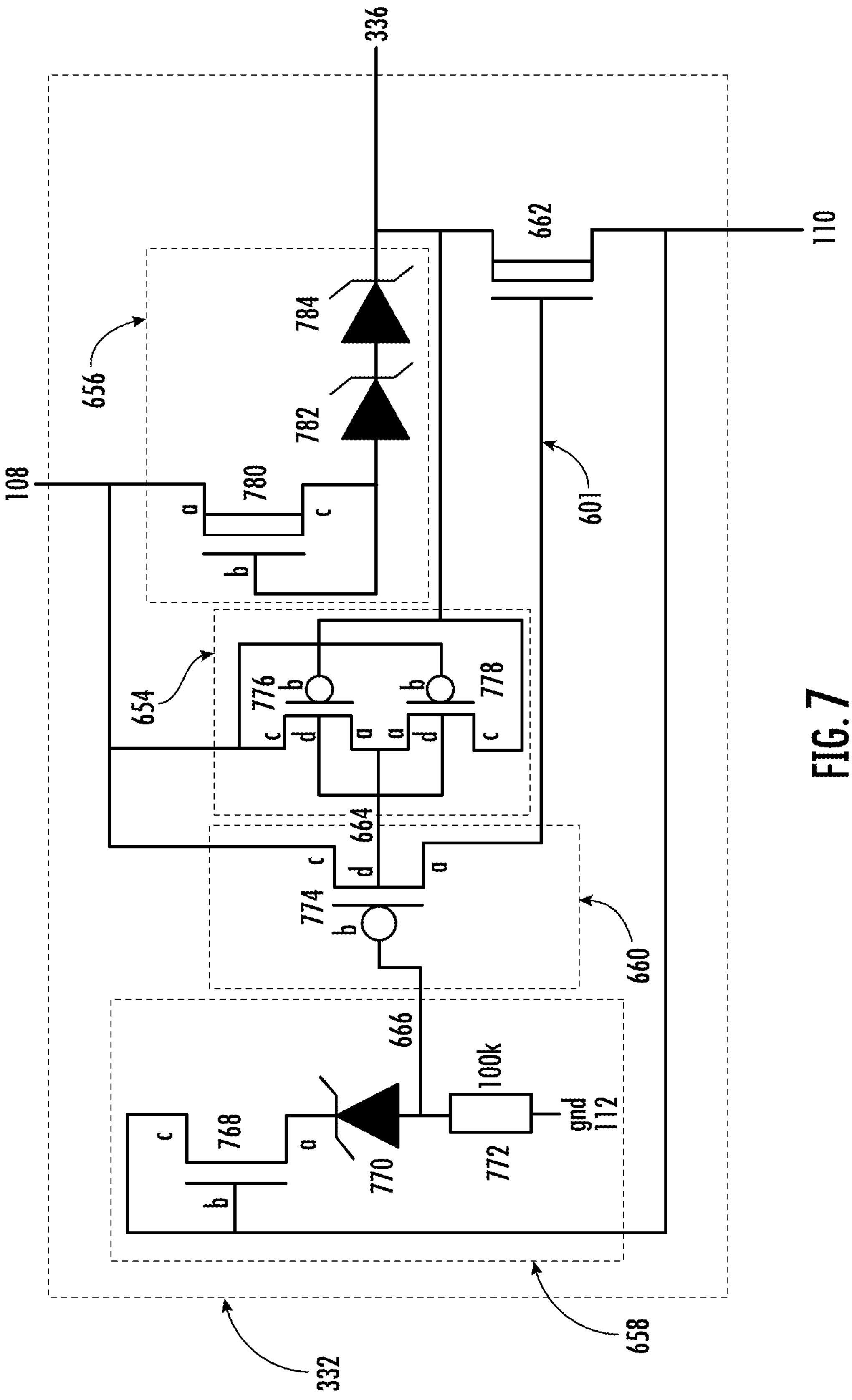
FIG. 7 illustrates an example circuit level diagram of an embodiment of second high side voltage control circuitry in accordance with an example embodiment of the present disclosure.

Referring now to FIG. 7, an example embodiment of the second high side voltage control circuitry 332 is depicted. As depicted in FIG. 7, the example embodiment of the second high side voltage control circuitry 332 includes an example embodiment of gate minimum voltage generator circuitry 658, an example embodiment of modified AC component generator circuitry 660, an example embodiment of bulk voltage generator circuitry 654, an example embodiment of intermediate voltage discharge circuitry 656, and an example second high side voltage control transistor 662.

As depicted in FIG. 7, the example gate minimum voltage generator circuitry 658 of the example embodiment of the second high side voltage control circuitry 332 includes a resistive element 772, a Zener diode 770, and a transistor 768 in diode configuration, connected in series between and electrical ground 112 and the DC voltage 110, with the anode of the Zener diode 770 electrically connected to the resistive element 772, and the cathode of the Zener diode 770 electrically connected to the source terminal 768*a* of the transistor 768. The example gate minimum voltage generator circuitry 658 of FIG. 7 is configured to output a gate minimum voltage 666 based on the threshold voltage of the Zener diode 770 and the transistor 768. For example, in an instance in which the DC voltage 110 is below the threshold voltage of the Zener diode 770, the gate minimum voltage 666 is 0. However, as the DC voltage 110 increases above the threshold of the Zener diode 770 plus the threshold of the transistor 768, the gate minimum voltage 666 may increase with the DC voltage 110. Thus, in an instance in which the threshold voltage of the transistor 768 is 1 volt and the threshold voltage of the Zener diode 770 is 6 volts, the gate minimum voltage may be 0 volts for any DC voltage 110 below 7 volts. However, once the DC voltage 110 increases above 7 volts, the gate minimum voltage 666 may be the DC voltage 110 minus the threshold of the transistor 768 (1 volt) minus the threshold of the Zener diode 770 (6 volts), or DC voltage 110 minus 7 volts.

As further depicted in FIG. 7, the example modified AC component generator circuitry 660 of the example embodiment of the second high side voltage control circuitry 332 includes a p-channel MOS (pMOS) transistor 774 configured to receive the second AC input 108 at the source terminal 774*c* of the transistor 774, the gate minimum voltage 666 at the gate terminal 774*b*, the second bulk voltage 664 at the bulk terminal 774*d* and generate the second modified AC component voltage 601 at the drain terminal 774*a* of the transistor 774. As depicted in FIG. 7, the second AC input 108 may be transmitted as the second modified AC component voltage 601 in an instance in which the second AC input 108 and the second modified AC component voltage 601 are higher than the gate minimum voltage 666 by at least the absolute value of the threshold voltage of the pMOS transistor 774 (e.g., 1 volt). For example, in an instance in which the DC voltage 110 is 10 volts, the source terminal 768*a* of the transistor 768 may be approximately 8.5 volts due to a 1.5 voltage drop across the transistor 768, and the gate minimum voltage 666 may equal 3 volts, for example, in an instance in which the threshold of the Zener diode 770 is 5.5 volts. In such an instance, the transistor 774 may transmit the second AC input 108 as the second modified AC component voltage 601 as long as the second AC input 108 is greater than 4 volts (e.g., gate minimum voltage 666 of 3 volts plus the threshold voltage of the transistor 774).

As further depicted in FIG. 7, the example bulk voltage generator circuitry 654 of the example embodiment of the second high side voltage control circuitry 332 includes a first pMOS transistor 776 and a second pMOS transistor 778 configured to output the second bulk voltage 664 substantially equivalent to the maximum voltage between the second high side intermediate voltage 336 and the second AC input 108. As depicted in FIG. 7, the source terminal 776*c* of the first pMOS transistor 776 is electrically connected to the second AC input 108, the gate terminal 776*b* is electrically connected to the second high side intermediate voltage 336, the drain terminal 776*a* is electrically connected to the drain terminal 778*a* of the second pMOS transistor 778, and the bulk terminal 776*d* is electrically connected to the second bulk voltage 664. Further, the source terminal 778*c* of the second pMOS transistor 778 is electrically connected to the second high side intermediate voltage 336, the gate terminal 778*b* is electrically connected to the second AC input 108, the drain terminal 778*a* is electrically connected to the drain terminal 776*a* of the first pMOS transistor 776, and the bulk terminal 778*d* is electrically connected to the second bulk voltage 664. The second bulk voltage 664 is generated from the electrical connection between the drain terminal 776*a* of the first pMOS transistor 776 and the drain terminal 778*a* of the second pMOS transistor 778.

As further depicted in FIG. 7, the example intermediate voltage discharge circuitry 656 of the example embodiment of the second high side voltage control circuitry 332 includes an nMOS transistor 780, a first Zener diode 782, and a second Zener diode 784 electrically connected in series between the second AC input 108 and the second high side intermediate voltage 336, wherein the anode of the first Zener diode 782 is electrically connected to the source terminal 780*c* of the nMOS transistor 780, the cathode of the first Zener diode 782 is electrically connected to the anode of the second Zener diode 784, and the cathode of the second Zener diode 784 generates the second high side intermediate voltage 336. As further depicted, the transistor 780 is configured in a diode configuration, wherein the source terminal 780*c* is electrically connected to the gate terminal 780*b*, and concurrently connected to the first Zener diode 782. As further depicted, the drain terminal 780*a* is electrically connected to the second AC input 108.

Figure 8:
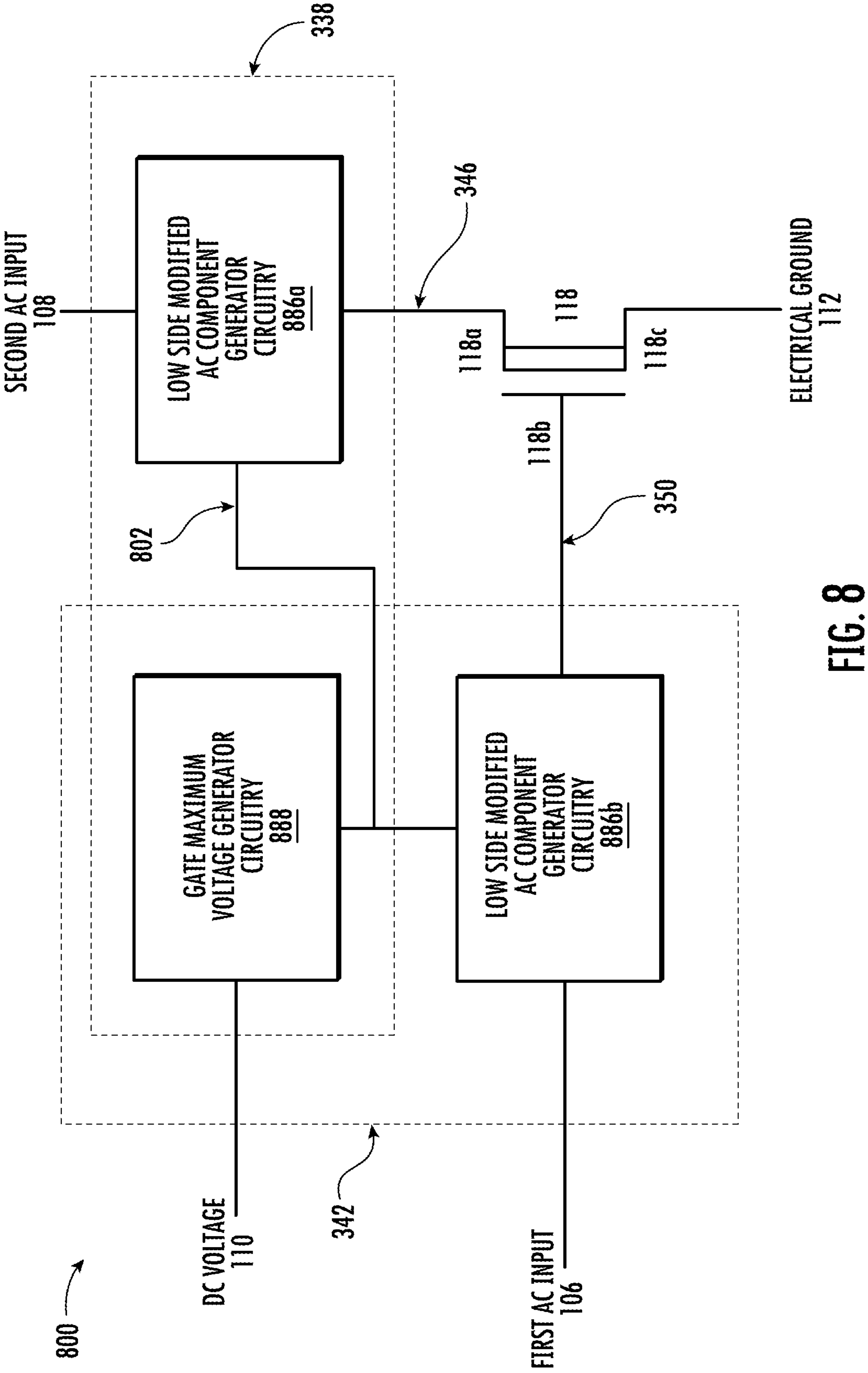
FIG. 8 illustrates a block diagram of an example second segment of the low side portion of an example bridge rectifier including example second drain low side voltage control circuitry and example second gate low side voltage control circuitry in accordance with an example embodiment of the present disclosure.

Referring now to FIG. 8, an example first segment 800 of the low side portion 304 of the example bridge rectifying circuitry 300 is provided. As depicted in FIG. 8, the example first segment 800 of the low side portion 304 of the example bridge rectifying circuitry 300 includes a second drain low side voltage control circuitry 338 configured to generate a second drain low side intermediate voltage 346 at the drain terminal 118*a* of the first low side transistor 118. As further depicted in FIG. 8, the example first segment 800 of the low side portion 304 of the example bridge rectifying circuitry 300 includes a second gate low side voltage control circuitry 342 configured to generate a second gate low side intermediate voltage 350 at the gate terminal 118*b* of the first low side transistor 118. Both the second drain low side voltage control circuitry 338, and the second gate low side voltage control circuitry 342, utilize gate maximum voltage generator circuitry 888 configured to receive a DC voltage 110 and produce a gate maximum voltage 802. The second drain low side voltage control circuitry 338 further includes low side modified AC component generator circuitry 886*a* configured to receive the gate maximum voltage 802 and the second AC input 108 to generate the second drain low side intermediate voltage 346. However, the second gate low side voltage control circuitry 342 further comprises low side modified AC component generator circuitry 886*b* configured to receive the gate maximum voltage 802 and the first AC input 106 to generate the second gate low side intermediate voltage 350.

As depicted in FIG. 8, the first segment 800 of the low side portion 304 of the example bridge rectifying circuitry 300 includes gate maximum voltage generator circuitry 888. Gate maximum voltage generator circuitry 888 is any electrical component or system of electrical components configured to output a gate maximum voltage 802 defining a maximum voltage for each of the AC components (e.g., first AC input 106, second AC input 108) based at least in part of the DC voltage 110 generated by the bridge rectifying circuitry 300. The gate maximum voltage 802 dictates, at least in part, the maximum voltage of the intermediate voltages (e.g., second drain low side intermediate voltage 346, second gate low side intermediate voltage 350 supplied to the drain terminal 118*a* and the gate terminal 118*b*, respectively of the first low side transistor 118).

In some embodiments, the gate maximum voltage 802 varies based on the amplitude of the DC voltage 110. For example, the gate maximum voltage 802 may be substantially equivalent to the DC voltage 110, until a maximum voltage is reached, after which the gate maximum voltage 802 may remain at the maximum voltage while the DC voltage 110 continues to increase. A specific embodiment of the gate maximum voltage generator circuitry 888 is shown in relation to FIG. 9-FIG. 10. The gate maximum voltage 802 is described further in relation to FIG. 15.

As further depicted in FIG. 8, both the second drain low side voltage control circuitry 338, and the second gate low side voltage control circuitry 342 of the first segment 800 of the low side portion 304 of the example bridge rectifying circuitry 300 include low side modified AC component generator circuitry 886*a*, 886*b*. As depicted in FIG. 8, the first instance of the low side modified AC component generator circuitry 886*a* receives the gate maximum voltage 802 and generates the second drain low side intermediate voltage 346 based on the second AC input 108. Similarly, the second instance of the low side modified AC component generator circuitry 886*b* receives the gate maximum voltage 802 but generates the second gate low side intermediate voltage 350 based on the first AC input 106. The low side modified AC component generator circuitry 886*a*, 886*b* is any electrical component or system of electrical components configured to generate an intermediate voltage (e.g., second drain low side intermediate voltage 346, second gate low side intermediate voltage 350) based on an input voltage (e.g., second AC input 108, first AC input 106), clamped based on a maximum voltage (e.g., gate maximum voltage 802).

In some embodiments, the intermediate voltage (e.g., second drain low side intermediate voltage 346, second gate low side intermediate voltage 350) may substantially follow the AC input (e.g., second AC input 108, first AC input 106) in an instance in which the AC input is below the supplied gate maximum voltage 802. Once the AC input exceeds the supplied gate maximum voltage 802 the intermediate voltage may level off and remain at the gate maximum voltage 802. A specific embodiment of the low side modified AC component generator circuitry 886*a* is shown in relation to FIG. 9. A specific embodiment of the low side modified AC component generator circuitry 886*b* is shown in relation to FIG. 10.

Figure 9:
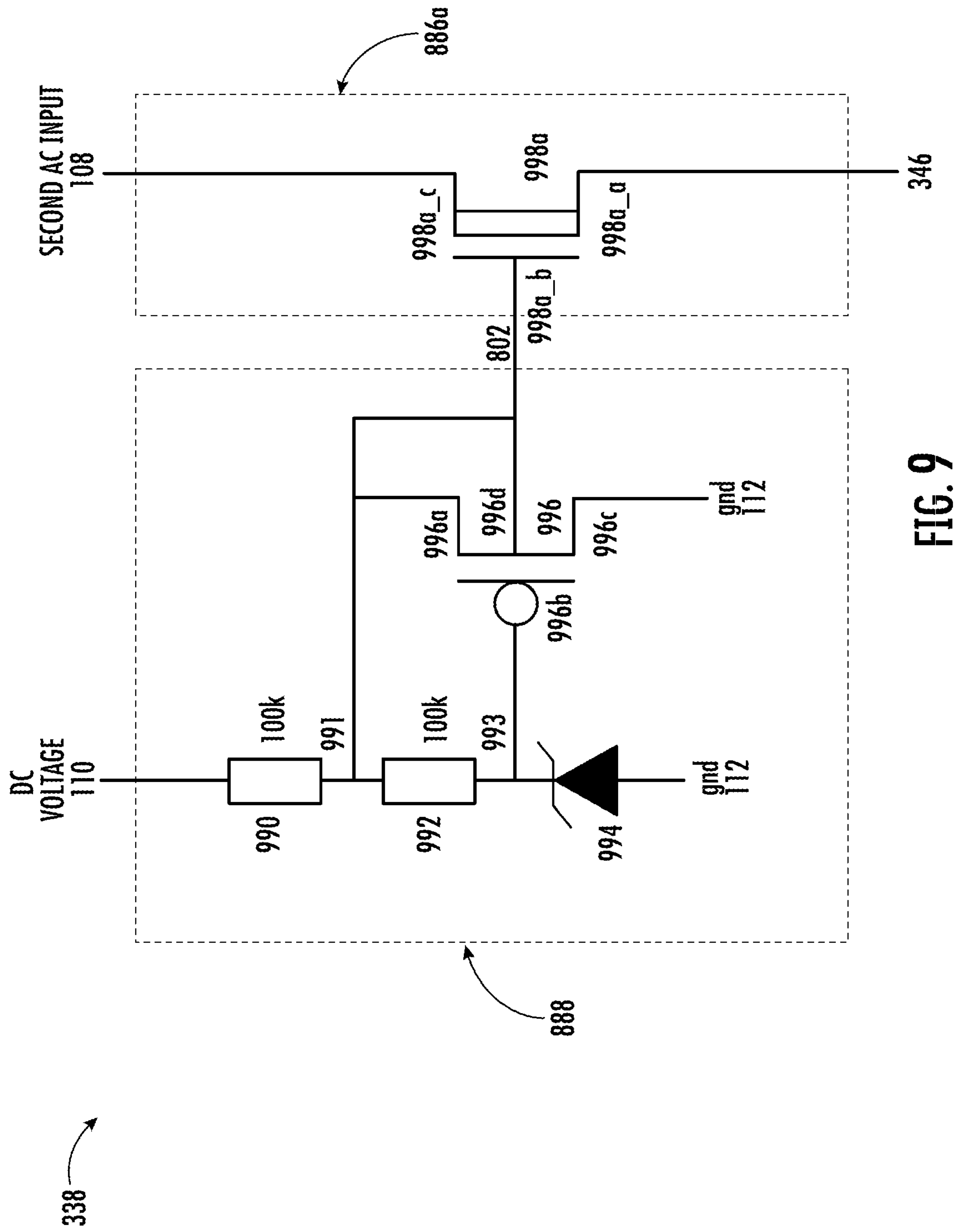
FIG. 9 illustrates an example circuit level diagram of an embodiment of second drain low side voltage control circuitry in accordance with an example embodiment of the present disclosure.

Referring now to FIG. 9, a specific embodiment of the second drain low side voltage control circuitry 338 is provided. As depicted in FIG. 9, the second drain low side voltage control circuitry 338 includes example gate maximum voltage generator circuitry 888 configured to receive the DC voltage 110 and generate a gate maximum voltage 802. As further depicted in FIG. 9, example low side modified AC component generator circuitry 886*a* is configured to receive the gate maximum voltage 802 and the second AC input 108 and generate the second drain low side intermediate voltage 346.

As depicted in FIG. 9, the gate maximum voltage generator circuitry 888 includes a Zener diode 994, a first resistive element 992, and a second resistive element 990 electrically connected in series between electrical ground 112 and the DC voltage 110, with the anode of the Zener diode 994 electrically connected to electrical ground 112, and the cathode of the Zener diode 994 electrically connected to the first resistive element 992. The tap point 991 between the first resistive element 992 and the second resistive element 990 is electrically connected to the drain terminal 996*a* and the bulk terminal 996*d* of a pMOS transistor 996. In addition, the tap point 993 between the Zener diode 994 and the first resistive element 992 is electrically connected to the gate terminal 996*b* of the pMOS transistor 996. The source terminal 996*c* of the pMOS transistor 996 is electrically connected to electrical ground 112. Thus, the gate maximum voltage 802 generated by the gate maximum voltage generator circuitry 888 is based, at least in part, on the threshold voltage of the Zener diode 994 and the threshold voltage of the pMOS transistor 996. For example, in an instance in which the DC voltage 110 is below the threshold voltage of the Zener diode 994, the Zener diode 994 is turned off and the gate maximum voltage 802 is substantially equivalent to the DC voltage 110. However, in an instance in which the DC voltage is greater than the Zener diode 994 plus the threshold voltage of the pMOS transistor 996, the pMOS transistor 996 is enabled (e.g., drives current) and the gate maximum voltage 802 is clamped.

As further depicted in FIG. 9, the low side modified AC component generator circuitry 886*a* includes an nMOS transistor 998*a*. As depicted in FIG. 9, the source terminal 998*a_c* of the nMOS transistor 998*a* is electrically connected to the second AC input 108, and the gate terminal 998*a_b* is electrically connected to the gate maximum voltage 802. Thus, the second drain low side intermediate voltage 346 generated at the drain terminal 998*a_a* of the nMOS transistor 998*a* prevents a voltage difference between the drain terminal 118*a* and the gate terminal 118*b* of the first low side transistor 118 from exceeding the maximum voltage rating of the first low side transistor 118.

Figure 10:
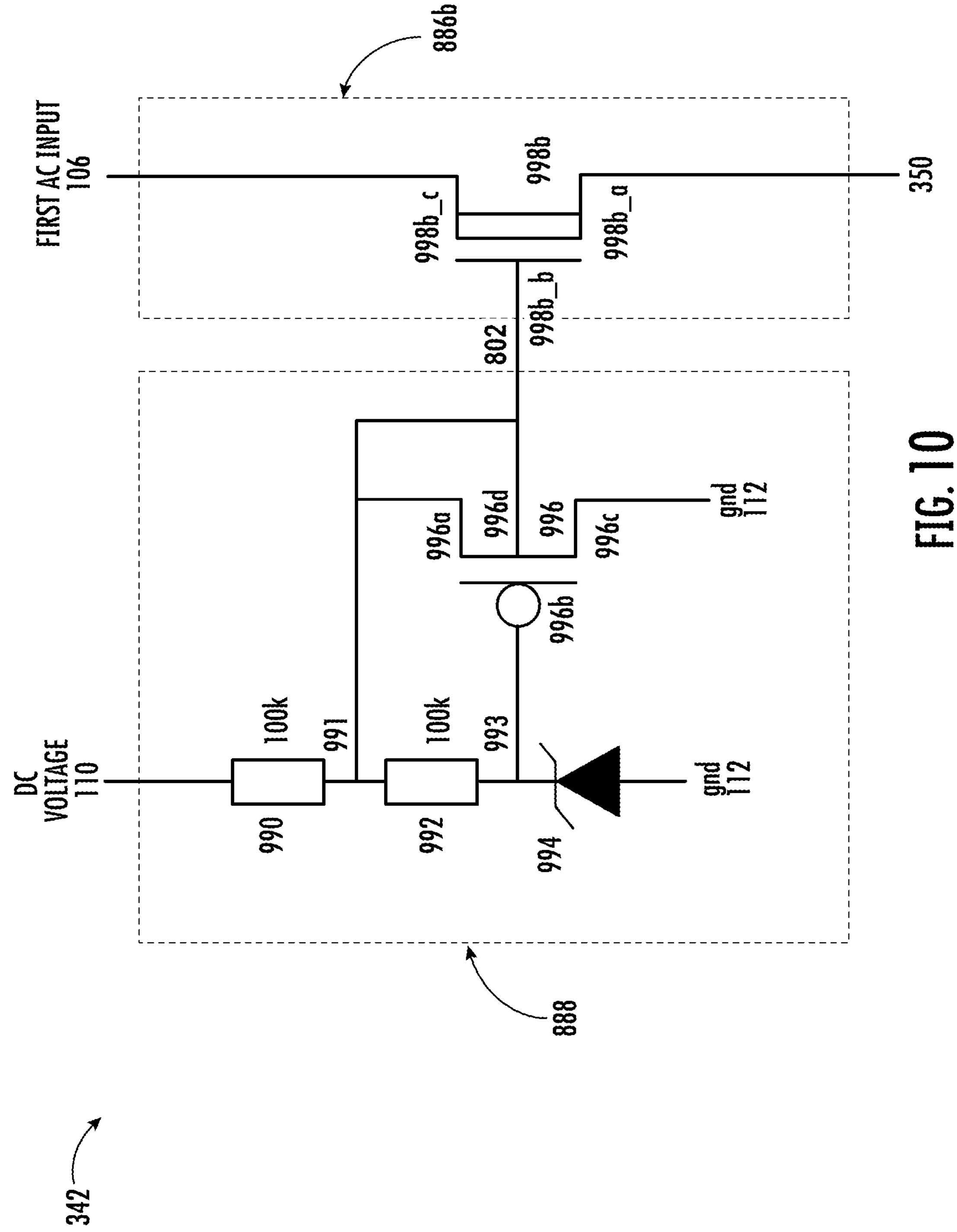
FIG. 10 illustrates an example circuit level diagram of an embodiment of second gate low side voltage control circuitry in accordance with an example embodiment of the present disclosure.

Referring now to FIG. 10, a specific embodiment of the second gate low side voltage control circuitry 342 is provided. As depicted in FIG. 10, the second gate low side voltage control circuitry 342 includes example gate maximum voltage generator circuitry 888 configured to receive the DC voltage 110 and generate a gate maximum voltage 802. As further depicted in FIG. 10, example low side modified AC component generator circuitry 886*b* is configured to receive the gate maximum voltage 802 and the first AC input 106 and generate the second gate low side intermediate voltage 350.

As depicted in FIG. 10, second gate low side voltage control circuitry 342 includes gate maximum voltage generator circuitry 888. The example embodiment of gate maximum voltage generator circuitry 888 depicted in FIG. 10 is equivalent to the gate maximum voltage generator circuitry 888 depicted in FIG. 9. As shown in FIG. 8, in some embodiments, the first segment 800 of the low side portion 304 of the bridge rectifying circuitry 300 may comprise shared gate maximum voltage generator circuitry 888 configured to generate a gate maximum voltage 802 supplied to both the low side modified AC component generator circuitry 886*a* and the low side modified AC component generator circuitry 886*b*.

As further depicted in FIG. 10, the low side modified AC component generator circuitry 886*b* includes an nMOS transistor 998*b*. As depicted in FIG. 10, the source terminal 998*b_c* of the nMOS transistor 998*b* is electrically connected to the first AC input 106, and the gate terminal 998*b_b* is electrically connected to the gate maximum voltage 802. Thus, the second gate low side intermediate voltage 350 generated at the drain terminal 998*b_a* of the nMOS transistor 998*b* prevents a voltage difference between the gate terminal 118*b* and the drain terminal 118*a* (and/or the source terminal 118*c*) of the first low side transistor 118 from exceeding the maximum voltage rating of the first low side transistor 118.

Figure 11:
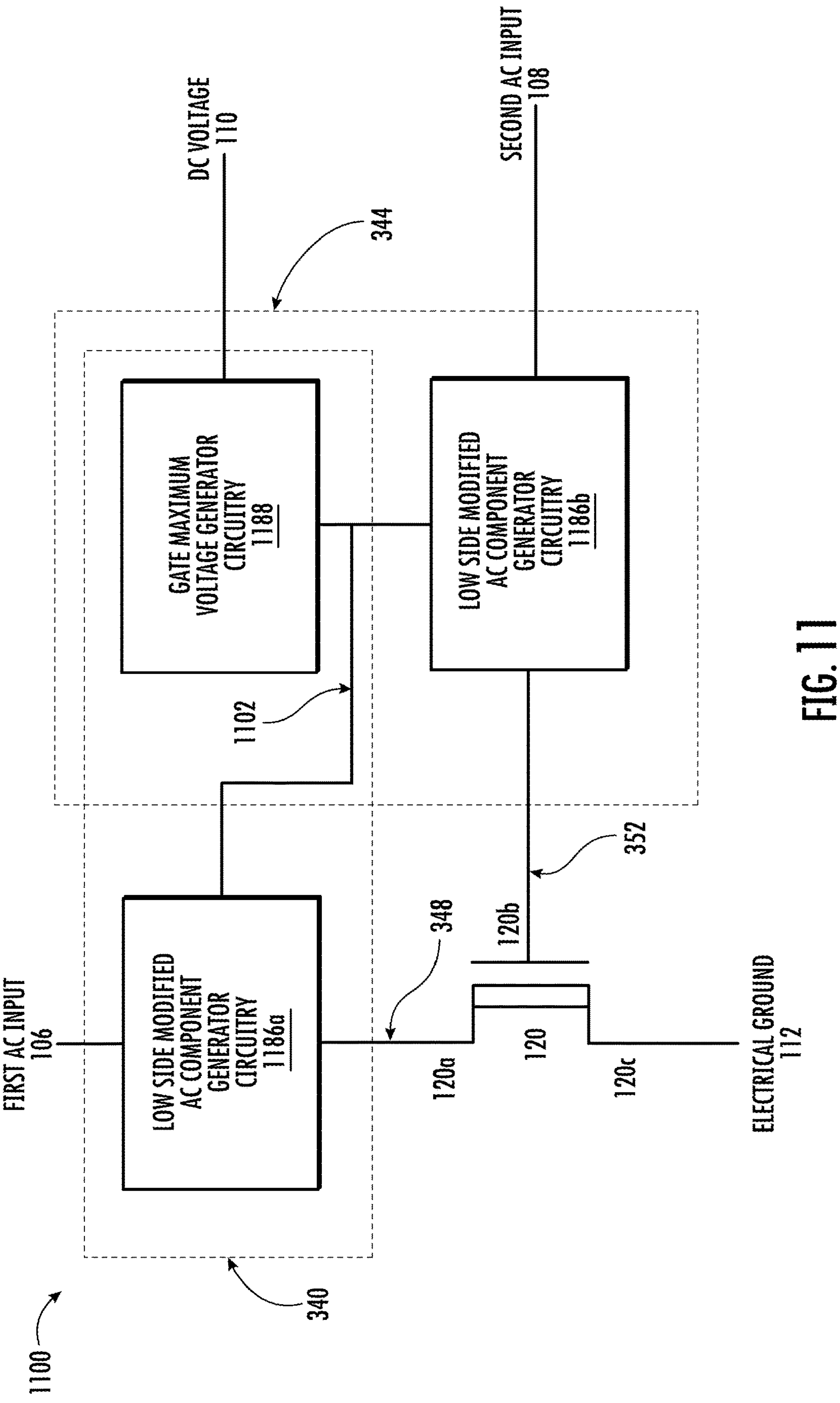
FIG. 11 illustrates a block diagram of an example first segment of the low side portion of an example bridge rectifier including example first drain low side voltage control circuitry and example first gate low side voltage control circuitry in accordance with an example embodiment of the present disclosure.

Referring now to FIG. 11, an example first segment 1100 of the low side portion 304 of the example bridge rectifying circuitry 300 is provided. As depicted in FIG. 11, the example first segment 1100 of the low side portion 304 of the example bridge rectifying circuitry 300 includes a first drain low side voltage control circuitry 340 configured to generate a first drain low side intermediate voltage 348 at the drain terminal 120*a* of the second low side transistor 120. As further depicted in FIG. 11, the example first segment 1100 of the low side portion 304 of the example bridge rectifying circuitry 300 includes a first gate low side voltage control circuitry 344 configured to generate a first gate low side intermediate voltage 352 at the gate terminal of the second low side transistor 120. Both the first drain low side voltage control circuitry 340, and the first gate low side voltage control circuitry 344, utilize gate maximum voltage generator circuitry 1188 configured to receive a DC voltage 110 and produce a gate maximum voltage 1102. The first drain low side voltage control circuitry 340 further includes low side modified AC component generator circuitry 1186*a* configured to receive the gate maximum voltage 1102 and the first AC input 106 to generate the first drain low side intermediate voltage 348. However, the first gate low side voltage control circuitry 344 further comprises low side modified AC component generator circuitry 1186*b* configured to receive the gate maximum voltage 1102 and the second AC input 108 to generate the first gate low side intermediate voltage 352.

As depicted in FIG. 11, the first segment 1100 of the low side portion 304 of the example bridge rectifying circuitry 300 includes gate maximum voltage generator circuitry 1188. Gate maximum voltage generator circuitry 1188 is any electrical component or system of electrical components configured to output a gate maximum voltage 1102 defining a maximum voltage for each of the AC components (e.g., first AC input 106, second AC input 108) based at least in part of the DC voltage 110 generated by the bridge rectifying circuitry 300. The gate maximum voltage 1102 dictates, at least in part, the maximum voltage of the intermediate voltages (e.g., first drain low side intermediate voltage 348, first gate low side intermediate voltage 352 supplied to the source terminal 120*c* and the gate terminal 120*b*, respectively of the second low side transistor 120).

In some embodiments, the gate maximum voltage 1102 varies based on the amplitude of the DC voltage 110. For example, the gate maximum voltage 1102 may be substantially equivalent to the DC voltage 110, until a maximum voltage is reached, after which the gate maximum voltage 1102 may remain at the maximum voltage while the DC voltage 110 continues to increase. In some embodiments, the gate maximum voltage generator circuitry 1188 may comprise one or more electrical components in common with the gate maximum voltage generator circuitry 888. A specific embodiment of the gate maximum voltage generator circuitry 1188 is shown in relation to FIG. 12-FIG. 13. The gate maximum voltage 1102 is described further in relation to FIG. 15.

In some embodiments, the gate maximum voltage generator circuitry 888 and the gate maximum voltage generator circuitry 1188 may comprise a common shared circuitry block. In such an instance, the gate maximum voltage 802 depicted in FIG. 8 and FIG. 9, and the gate maximum voltage 1102 depicted in FIG. 11 and FIG. 12 may be the same unique node. Both the gate maximum voltage generator circuitry 888 and the gate maximum voltage generator circuitry 1188 may be generated by the same circuitry based on the electrical ground 112 and the DC voltage 110 and transmitted to the low side modified AC component generator circuitry 886*a*, 886*b* and the low side modified AC component generator circuitry 1186*a*, 1186*b*, respectively. Utilizing common circuitry to generate the gate maximum voltage 802 and the gate maximum voltage 1102 may reduce the overall area and the power consumption of the electrical component.

As further depicted in FIG. 11, both the first drain low side voltage control circuitry 340 and the first gate low side voltage control circuitry 344 of the first segment 1100 of the low side portion 304 of the example bridge rectifying circuitry 300 include low side modified AC component generator circuitry 1186*a*, 1186*b*. As depicted in FIG. 11, the first instance of the low side modified AC component generator circuitry 1186*a* receives the gate maximum voltage 1102 and generates the first drain low side intermediate voltage 348 based on the first AC input 106. Similarly, the second instance of the low side modified AC component generator circuitry 1186*b* receives the gate maximum voltage 1102 but generates the first gate low side intermediate voltage 352 based on the second AC input 108. The low side modified AC component generator circuitry 1186*a*, 1186*b* is any electrical component or system of electrical components configured to generate an intermediate voltage (e.g., first drain low side intermediate voltage 348, first gate low side intermediate voltage 352) based on an input voltage (e.g., first AC input 106, second AC input 108), clamped based on a maximum voltage (e.g., gate maximum voltage 1102).

In some embodiments, the intermediate voltage (e.g., first drain low side intermediate voltage 348, first gate low side intermediate voltage 352) may substantially follow the AC input (e.g., second AC input 108, first AC input 106) in an instance in which the AC input is below the supplied gate maximum voltage 1102. Once the AC input exceeds the supplied gate maximum voltage 1102 the intermediate voltage may level off and remain at the gate maximum voltage 1102. A specific embodiment of the low side modified AC component generator circuitry 1186*a* is shown in relation to FIG. 12. A specific embodiment of the low side modified AC component generator circuitry 1186*b* is shown in relation to FIG. 13.

Figure 12:
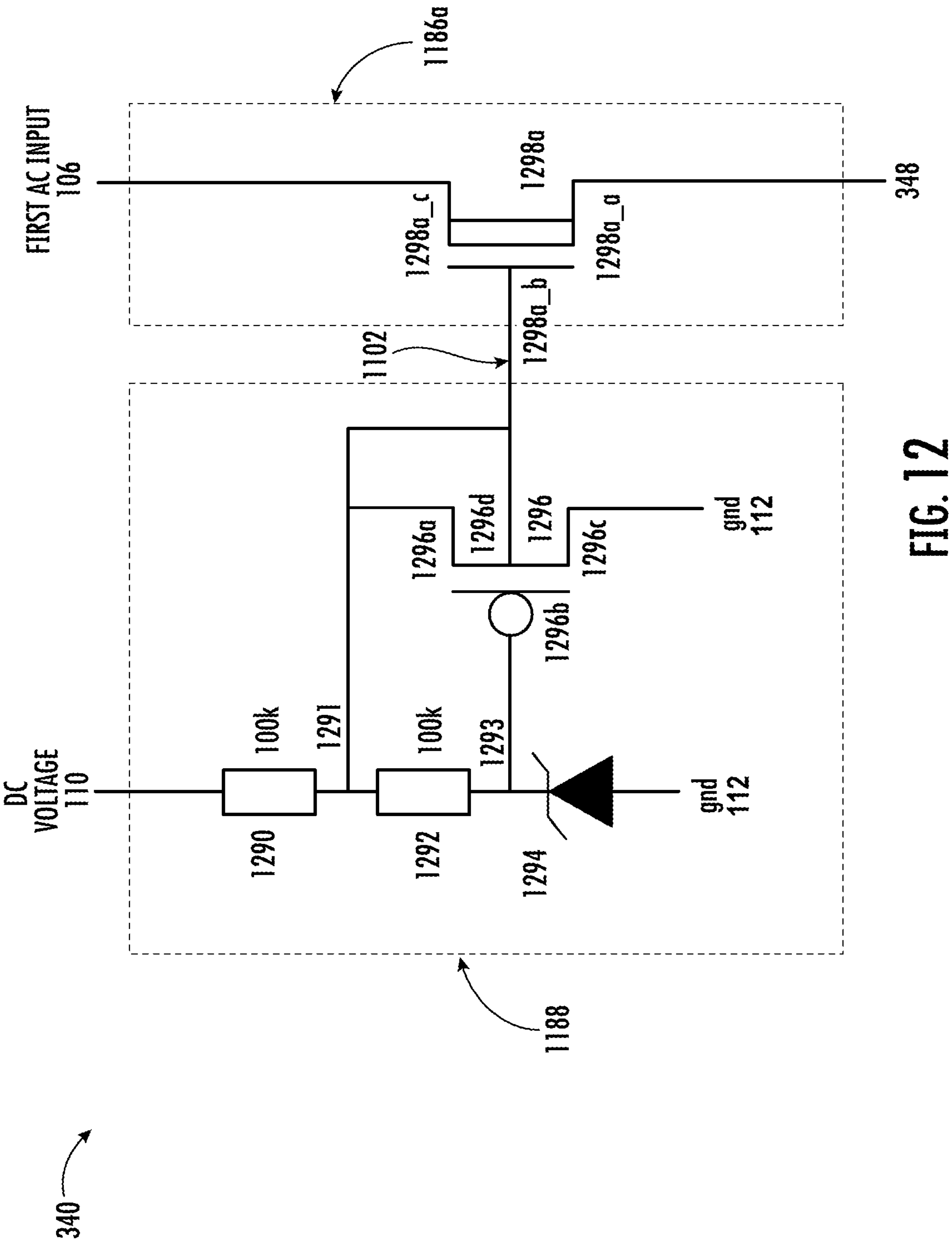
FIG. 12 illustrates an example circuit level diagram of an embodiment of first drain low side voltage control circuitry in accordance with an example embodiment of the present disclosure.

Referring now to FIG. 12, a specific embodiment of the first drain low side voltage control circuitry 340 is provided. As depicted in FIG. 12, the first drain low side voltage control circuitry 340 includes example gate maximum voltage generator circuitry 1188 configured to receive the DC voltage 110 and generate a gate maximum voltage 1102. As further depicted in FIG. 12, example low side modified AC component generator circuitry 1186*a* is configured to receive the gate maximum voltage 1102 and the first AC input 106 and generate the first drain low side intermediate voltage 348.

As depicted in FIG. 12, the gate maximum voltage generator circuitry 1188 includes a Zener diode 1294, a first resistive element 1292, and a second resistive element 1290 electrically connected in series between electrical ground 112 and the DC voltage 110, with the anode of the Zener diode 1294 electrically connected to electrical ground 112, and the cathode of the Zener diode 1294 electrically connected to the first resistive element 1292. The tap point 1291 between the first resistive element 1292 and the second resistive element 1290 is electrically connected to the drain terminal 1296*a* and the bulk terminal 1296*d* of a pMOS transistor 1296. In addition, the tap point 1293 between the Zener diode 1294 and the first resistive element 1292 is electrically connected to the gate terminal 1296*b* of the pMOS transistor 1296. The source terminal 1296*c* of the pMOS transistor 1296 is electrically connected to electrical ground 112. Thus, the gate maximum voltage 1102 generated by the gate maximum voltage generator circuitry 1188 is based, at least in part, on the threshold voltage of the Zener diode 1294 and the threshold voltage of the pMOS transistor 1296. For example, in an instance in which the DC voltage 110 is below the threshold voltage of the Zener diode 1294, the Zener diode 1294 is turned off and the gate maximum voltage 1102 is substantially equivalent to the DC voltage 110. However, in an instance in which the DC voltage is greater than the Zener diode 1294 plus the threshold voltage of the pMOS transistor 1296, the pMOS transistor 1296 is enabled (e.g., drives current) and the gate maximum voltage 1102 is clamped.

As further depicted in FIG. 12, the low side modified AC component generator circuitry 1186*a* includes an nMOS transistor 1298*a*. As depicted in FIG. 12, the source terminal 1298*a_c* of the nMOS transistor 1298*a* is electrically connected to the first AC input 106, and the gate terminal 1298*a_b* is electrically connected to the gate maximum voltage 1102. Thus, the first drain low side intermediate voltage 348 generated at the drain terminal 1298*a_a* of the nMOS transistor 1298*a* prevents a voltage difference between the drain terminal 120*a* and the gate terminal 120*b* of the first low side transistor 118 from exceeding the maximum voltage rating of the first low side transistor 118.

Figure 13:
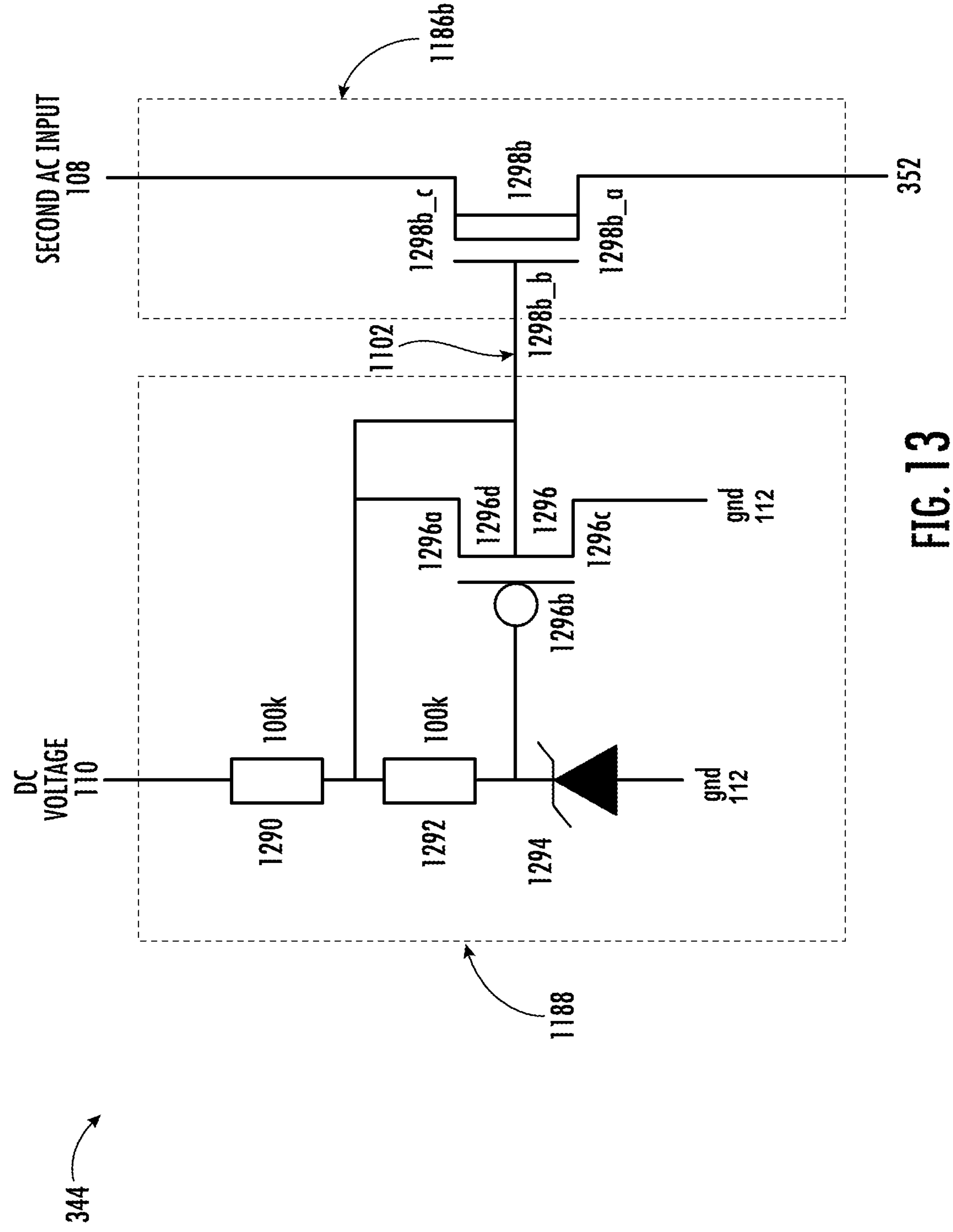
FIG. 13 illustrates an example circuit level diagram of an embodiment of first gate low side voltage control circuitry in accordance with an example embodiment of the present disclosure.

Referring now to FIG. 13, a specific embodiment of the first gate low side voltage control circuitry 344 is provided. As depicted in FIG. 13, the first gate low side voltage control circuitry 344 includes example gate maximum voltage generator circuitry 1188 configured to receive the DC voltage 110 and generate a gate maximum voltage 1102. As further depicted in FIG. 13, example low side modified AC component generator circuitry 1186*b* is configured to receive the gate maximum voltage 1102 and the second AC input 108 and generate the first gate low side intermediate voltage 352.

As depicted in FIG. 13, first gate low side voltage control circuitry 344 includes gate maximum voltage generator circuitry 1188. The example embodiment of gate maximum voltage generator circuitry 1188 depicted in FIG. 13 is equivalent to the gate maximum voltage generator circuitry 1188 depicted in FIG. 12. As shown in FIG. 11, in some embodiments, the first segment 1100 of the low side portion 304 of the bridge rectifying circuitry 300 may comprise shared gate maximum voltage generator circuitry 1188 configured to generate a gate maximum voltage 1102 supplied to both the low side modified AC component generator circuitry 1186*a* and the low side modified AC component generator circuitry 1186*b*.

As further depicted in FIG. 13, the low side modified AC component generator circuitry 1186*b* includes an nMOS transistor 1298*b*. As depicted in FIG. 13, the source terminal 1298*b_c* of the nMOS transistor 1298*b* is electrically connected to the second AC input 108, and the gate terminal 1298*b_b* is electrically connected to the gate maximum voltage 1102. Thus, the first gate low side intermediate voltage 352 generated at the drain terminal 1298*b_a* of the nMOS transistor 1298*b* prevents a voltage difference between the gate terminal 120*b* and the drain terminal 120*a*, and between the gate terminal 120*b* and the source terminal 120*c* of the second low side transistor 120 from exceeding the maximum voltage rating of the first low side transistor 118.

Figure 14:
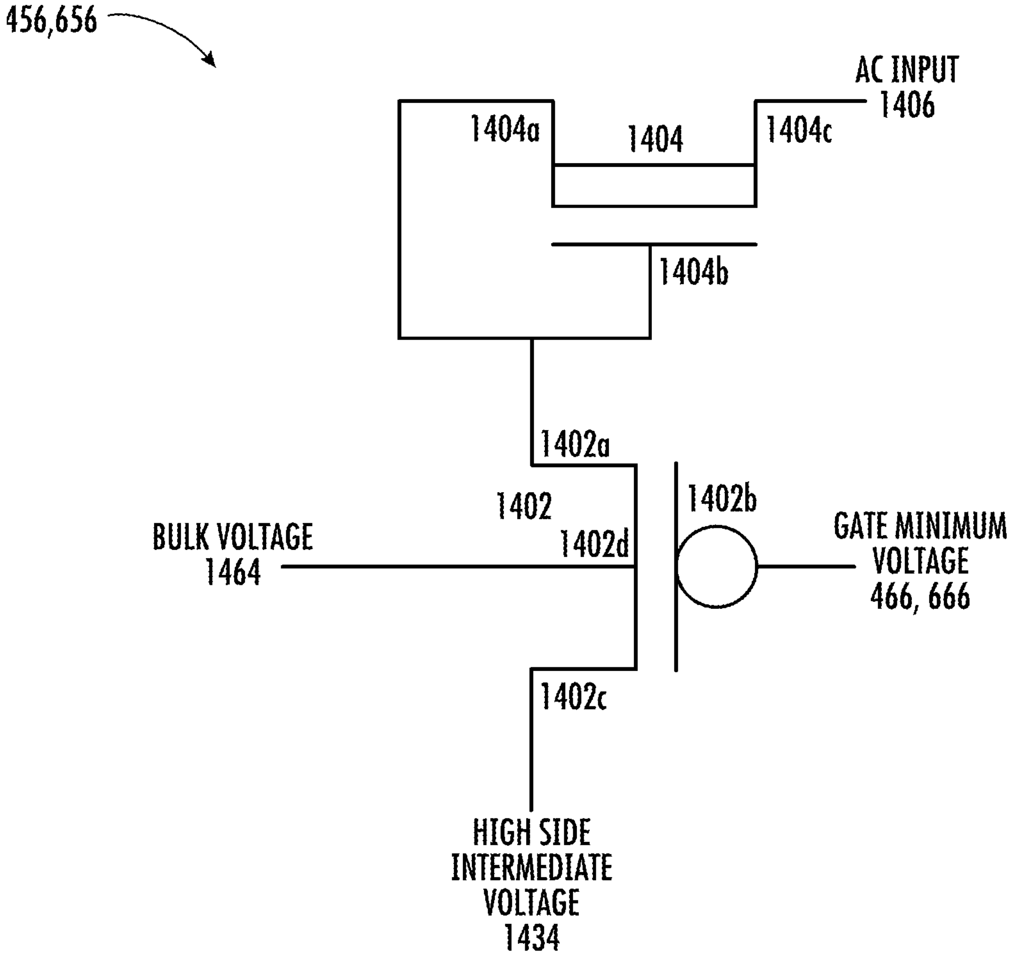
FIG. 14 illustrates an example circuit level diagram of an embodiment of intermediate voltage discharge circuitry in accordance with an example embodiment of the present disclosure.

Referring now to FIG. 14, an alternative embodiment of example intermediate voltage discharge circuitry 456, 656 is provided. As depicted in FIG. 14, the example intermediate voltage discharge circuitry 456, 656 includes an nMOS transistor 1404 in a diode configuration in which the gate terminal 1404*b* is electrically connected to the drain terminal 1404*a*. The AC input 1406 is received at the source terminal 1404*c* of the nMOS transistor 1404. In addition, the example intermediate voltage discharge circuitry 456, 656 includes a pMOS transistor 1402. As depicted in FIG. 14, the drain terminal 1402*a* of the pMOS transistor 1402 is electrically connected to the drain terminal 1404*a* of the nMOS transistor 1404, the gate terminal 1402*b* is electrically connected to the gate minimum voltage 466, 666, the bulk terminal 1402*d* is electrically connected to a bulk voltage 1464, and the source terminal 1402*c* is electrically connected to a high side intermediate voltage 1434.

As depicted in FIG. 14, the example embodiment of intermediate voltage discharge circuitry 456, 656 may be utilized in the first high side voltage control circuitry 330, the second high side voltage control circuitry 332, or both. For example, in an instance in which the intermediate voltage discharge circuitry 456, 656 of FIG. 14 is utilized in the first high side voltage control circuitry 330, the AC input 1406 is electrically connected to the first AC input 106, the bulk voltage 1464 is electrically connected to the first bulk voltage 464, and the high side intermediate voltage 1434 is electrically connected to the first high side intermediate voltage 334. Similarly, in an instance in which the intermediate voltage discharge circuitry 456, 656 of FIG. 14 is utilized in the second high side voltage control circuitry 332, the AC input 1406 is electrically connected to the second AC input 108, the bulk voltage 1464 is electrically connected to the second bulk voltage 664, and the high side intermediate voltage 1434 is electrically connected to the second high side intermediate voltage 336.

Figure 15:
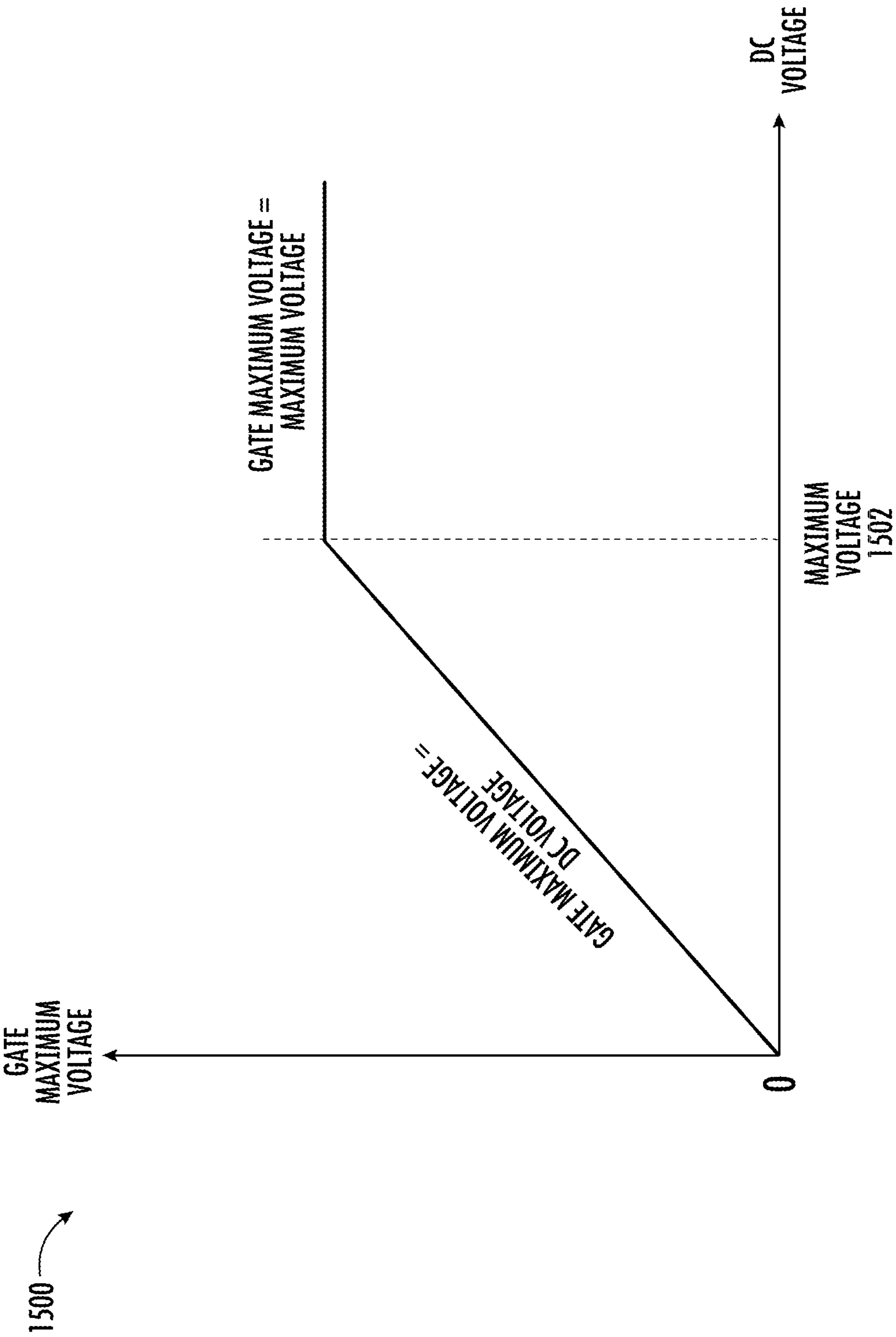
FIG. 15 illustrates an example graph of a gate maximum voltage in relation to a DC voltage in accordance with an example embodiment of the present disclosure.

Referring now to FIG. 15, a graph 1500 depicting an example gate maximum voltage (e.g., gate maximum voltage 802, 1102) given an example input DC voltage (e.g., DC voltage 110) is provided. As depicted in FIG. 15, the example gate maximum voltage is substantially equivalent to the DC voltage in instances in which the DC voltage is less than the maximum voltage 1502. For DC voltages above the maximum voltage 1502, the gate maximum voltage is substantially equivalent to the maximum voltage 1502.

As described herein, the maximum voltage 1502 is determined based on the electrical components of the gate maximum voltage generator circuitry (e.g., gate maximum voltage generator circuitry 888, gate maximum voltage generator circuitry 1188). For example, in some embodiments, the maximum voltage 1502 may be determined based at least in part on the threshold voltage of a Zener diode (e.g., Zener diode 994) and/or the threshold voltage of a transistor (e.g., pMOS transistor 996, pMOS transistor 1196) within the gate maximum voltage generator circuitry.

Figure 16:
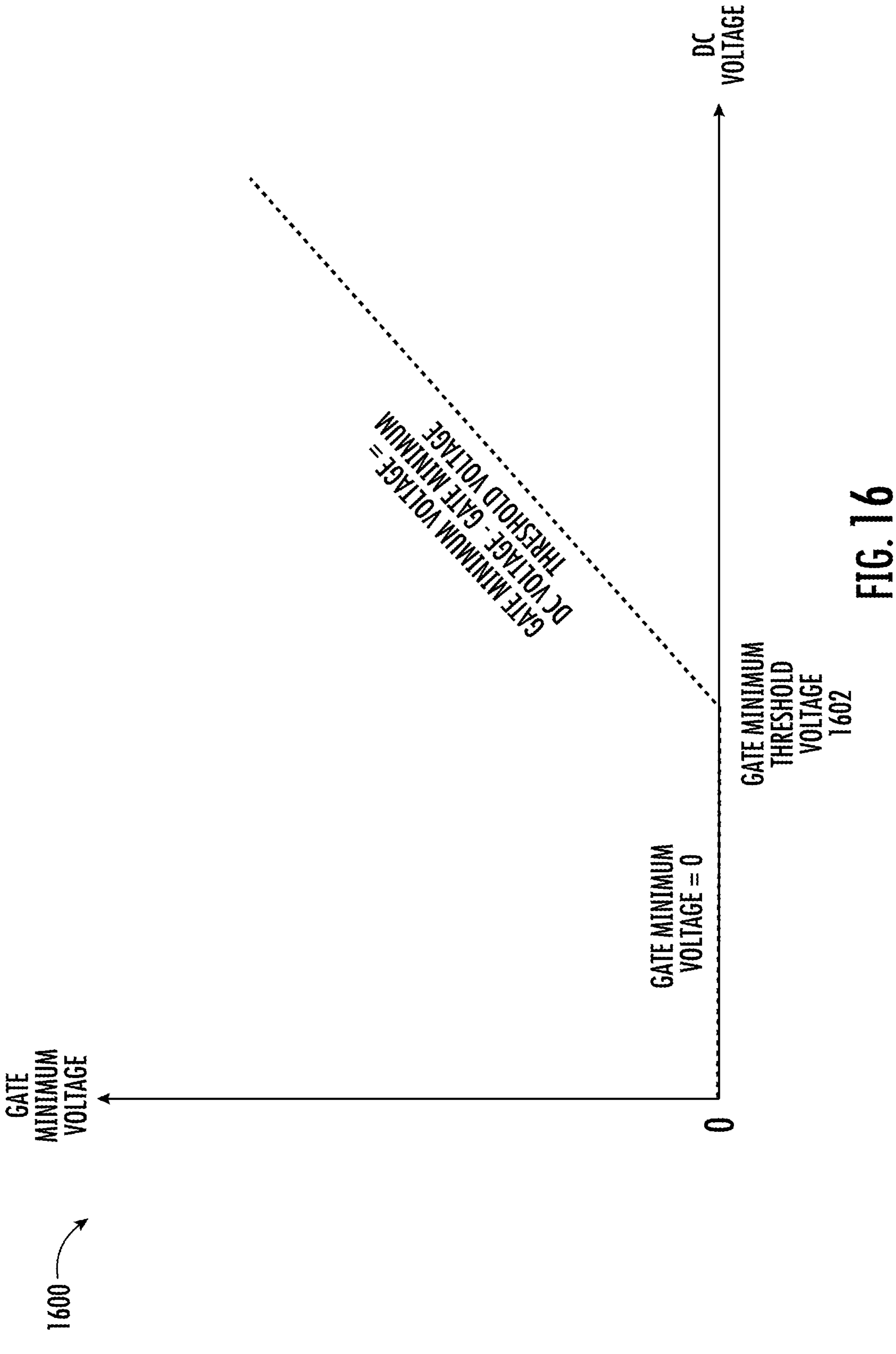
FIG. 16 illustrates an example graph of a gate minimum voltage in relation to a DC voltage in accordance with an example embodiment of the present disclosure.

Referring now to FIG. 16, a graph 1600 depicting an example gate minimum voltage (e.g., gate minimum voltage 466, 666) given an example input DC voltage (e.g., DC voltage 110) is provided. As depicted in FIG. 16, the example gate minimum voltage is equal to 0 volts when the DC voltage is below the gate minimum threshold voltage 1602. In an instance in which the DC voltage exceeds the gate minimum threshold voltage 1602, the gate minimum voltage is substantially equivalent to the DC voltage minus the gate minimum threshold voltage 1602.

As described herein, the gate minimum threshold voltage 1602 is determined based on the electrical components of the gate minimum voltage generator circuitry (e.g., gate minimum voltage generator circuitry 458, 658). For example, in some embodiments, the gate minimum threshold voltage 1602 may be determined based at least in part on the threshold voltage of a Zener diode (e.g., Zener diode 570, 770) and or the threshold voltage of a transistor (e.g., transistor 568, 768) comprising the gate minimum voltage generator circuitry. As shown in FIG. 16, in an instance in which the DC voltage exceeds the gate minimum threshold voltage 1602, the date minimum voltage is substantially equivalent to the DC voltage minus the gate minimum threshold voltage 1602.

Figure 17:
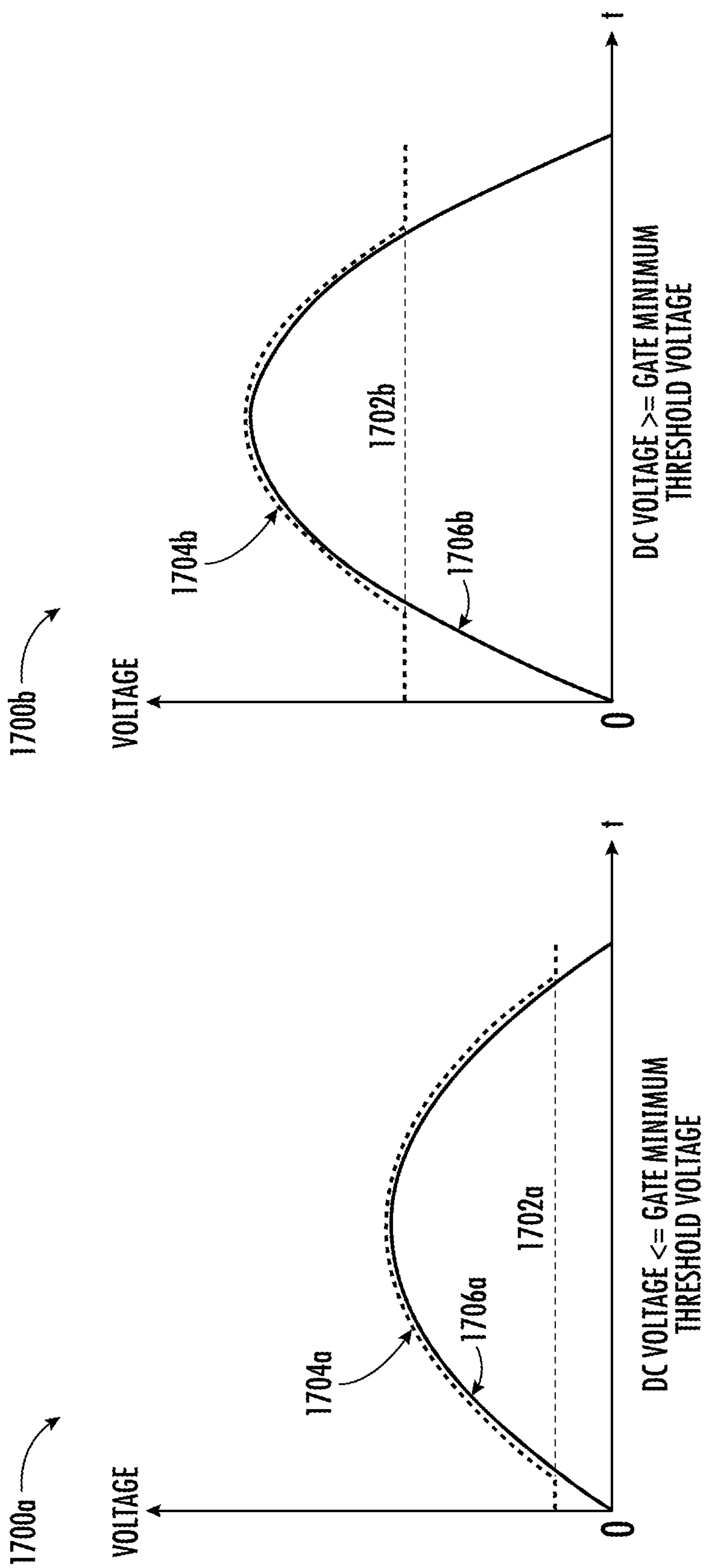
FIG. 17 illustrates a series of example modified AC component voltages in accordance with an example embodiment of the present disclosure.

Referring now to FIG. 17, a graph 1700*a* depicting an example modified AC component voltage 1704*a* (e.g., modified AC component voltage 401, modified AC component voltage 601) in an instance in which the DC voltage is below the gate minimum threshold voltage and a graph 1700*b* depicting an example modified AC component voltage 1704*b* in an instance in which the DC voltage is above the gate minimum threshold voltage, are depicted.

As depicted in FIG. 17, a modified AC minimum voltage 1702*a*, 1702*b* is determined based on the internal electrical components of the modified AC component generator circuitry (e.g., modified AC component generator circuitry 460, 660). For example, in an instance in which the DC voltage is below the gate minimum threshold voltage 1602 (as depicted in graph 1700*a*), and the Zener diode (e.g., Zener diode 570, Zener diode 770) drives no current (e.g., is in an "off" state), the modified AC minimum voltage 1702*a* may be determined based on the threshold voltage of a transistor (e.g., transistor 574, transistor 774). In such an instance, the modified AC component voltage 1704*a* may be substantially equivalent to the AC input voltage 1706*a* when the AC input voltage is above the modified AC minimum voltage 1702*a* plus the threshold (in absolute value) of any internal electrical components (e.g., pMOS transistor 574, 774). However, in an instance in which the AC input voltage 1706*a* drops below the modified AC minimum voltage 1702*a* (plus the absolute value of the threshold of the internal electrical components, e.g., pMOS transistor 574, 774), the modified AC component voltage 1704*a* remains substantially equivalent to the modified AC minimum voltage 1702*a* (plus the absolute value of the threshold of the internal electrical components, e.g., pMOS transistor 574, 774).

In an instance in which the DC voltage is above the gate minimum threshold voltage 1602 (as depicted in graph 1700*b*), and the Zener diode (e.g., Zener diode 570, Zener diode 770) is enabled (e.g., drives current), the modified AC minimum voltage 1702*b* may be determined based on the gate minimum voltage (e.g., gate minimum voltage 466, 666) and the threshold voltage of the transistor (e.g., transistor 574, transistor 774). In such an instance, the modified AC component voltage **1704*b* may be substantially equivalent to the AC input voltage 1706*b* when the AC input voltage is above the modified AC minimum voltage 1702*b* plus the threshold (in absolute value) of any internal electrical components (e.g., pMOS transistor 574, 774). However, in an instance in which the AC input voltage 1706*b* drops below the modified AC minimum voltage 1702*b* (plus the absolute value of the threshold of the internal electrical components, e.g., pMOS transistor 574, 774), the modified AC component voltage 1704*b* remains substantially equivalent to the modified AC minimum voltage 1702*b* (plus the absolute value of the threshold of the internal electrical components, e.g., pMOS transistor 574, 774). By generating a modified AC input voltage that remains above a modified AC minimum voltage 1702*a*, 1702*b***, the voltage control circuitry reduces the stress on the transistors of the bridge rectifier circuitry.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes bridge rectifying circuitry. For example, a wireless power receiver, power inverter, charger circuit, a motor, a voltage regulator, and other similar electrical devices. Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A bridge rectifier circuit configured to receive an alternating current (AC) voltage across a first AC input and a second AC input and generate a direct current (DC) voltage, the bridge rectifier circuit comprising:
- a plurality of rectifying transistors comprising at least:
  - a first high side transistor comprising a drain terminal, a gate terminal, and a source terminal;
- first high side voltage control circuitry configured to output a first high side intermediate voltage based on the first AC input and the DC voltage to the source terminal of the first high side transistor,
  - wherein the first high side intermediate voltage prevents a first high side voltage difference across the source terminal and the gate terminal of the first high side transistor from exceeding a maximum voltage rating of the first high side transistor.

2. The bridge rectifier circuit of claim 1, further comprising:
- a high side portion comprising:
  - the first high side transistor; and
  - a second high side transistor,
  - wherein the high side portion is configured to generate the DC voltage; and
- a low side portion comprising:
  - a first low side transistor; and
  - a second low side transistor,
  - wherein the low side portion is configured to connect to an electrical ground reference.

3. The bridge rectifier circuit of claim 2,
- wherein a second high side voltage control circuitry is electrically connected to a source terminal of the second high side transistor.

4. The bridge rectifier circuit of claim 3, wherein the first high side transistor is configured in a diode configuration, wherein the drain terminal of the first high side transistor is electrically connected to the gate terminal of the first high side transistor.

5. The bridge rectifier circuit of claim 1, wherein in an instance in which the first AC input is below a minimum input voltage, the first high side voltage control circuitry generates the first high side intermediate voltage at the source terminal of the first high side transistor, wherein a difference between the first AC input and the first high side intermediate voltage is less than a first high side maximum voltage rating of the first high side transistor.

6. The bridge rectifier circuit of claim 1, wherein in an instance in which the first AC input is above a maximum output voltage, the first high side voltage control circuitry exhibits a negligible voltage drop across the first high side voltage control circuitry.

7. The bridge rectifier circuit of claim 1, wherein the first high side voltage control circuitry comprises a first high side voltage control transistor,
- wherein a drain terminal of the first high side voltage control transistor is electrically connected to the drain terminal of the first high side transistor,
- wherein a source terminal of the first high side voltage control transistor is electrically connected to the DC voltage, and
- wherein the gate terminal of the first high side voltage control transistor is configured to receive a first modified AC component voltage based at least in part on the first AC input and the DC voltage.

8. The bridge rectifier circuit of claim 7, wherein the first modified AC component voltage remains above a minimum high side voltage control transistor voltage.

9. The bridge rectifier circuit of claim 8, wherein a gate minimum voltage generator circuitry generates a gate minimum voltage based at least in part on a voltage difference between the DC voltage and an electrical ground reference.

10. The bridge rectifier circuit of claim 9, wherein the minimum high side voltage control transistor voltage is based at least in part on the gate minimum voltage generated based at least in part on the DC voltage.

11. The bridge rectifier circuit of claim 7, wherein the first high side voltage control circuitry further comprises intermediate voltage discharge circuitry configured to discharge the first high side intermediate voltage based at least in part on the first AC input.

12. The bridge rectifier circuit of claim 9, wherein the first modified AC component voltage is generated by a modified AC component generator circuitry.

13. The bridge rectifier circuit of claim 12, wherein the modified AC component generator circuitry generates the first modified AC component voltage based at least in part on the gate minimum voltage generated by the gate minimum voltage generator circuitry, the first AC input, and a first bulk voltage generated by a bulk voltage generator circuitry.

* * * * *